US012560071B2

(12) United States Patent
    Fink et al.

(10) Patent No.: US 12,560,071 B2
(45) Date of Patent: Feb. 24, 2026

(54) APPARATUS AND METHOD FOR HARNESSING ENERGY FROM A WELLBORE TO PERFORM MULTIPLE FUNCTIONS WHILE REDUCING EMISSIONS

(71) Applicant: CNX Resources Corporation, Canonsburg, PA (US)

(72) Inventors: Joseph M. Fink, Washington, PA (US); Nicholas Joseph Phipps, Morgantown, WV (US); Joshua Wayne Mullins, Morgantown, WV (US); Kevin Robert Egeland, Pittsburgh, PA (US); Albert Edwin Jones, Bridgeville, PA (US)

(73) Assignee: CNX Resources Corporation, Canonsburg, PA (US)

( * ) Notice: Subject to any disclaimer, the term of this patent is extended or adjusted under 35 U.S.C. 154(b) by 1092 days.

(21) Appl. No.: 17/470,438

(22) Filed: Sep. 9, 2021

(65) Prior Publication Data

US 2022/0154568 A1 May 19, 2022

Related U.S. Application Data

(60) Provisional application No. 63/089,777, filed on Oct. 9, 2020.

(51) Int. Cl.
    *B01D 21/24* (2006.01)
    *B01D 21/34* (2006.01)
    *E21B 43/34* (2006.01)
(52) U.S. Cl.
    CPC .......... *E21B 43/35* (2020.05); *B01D 21/2411* (2013.01); *B01D 21/2422* (2013.01);
    (Continued)

(58) Field of Classification Search
    CPC . E21B 43/35; B01D 21/2411; B01D 21/2422; B01D 21/245; B01D 21/34; B01D 2221/04
    See application file for complete search history.

(56) References Cited

U.S. PATENT DOCUMENTS

| | | | |
|---|---|---|---|
| 1,946,182 A | 2/1934 | Thompson | |
| 2,873,814 A | 2/1959 | Maher | |
| | | (Continued) | |

FOREIGN PATENT DOCUMENTS

| | | | |
|---|---|---|---|
| CN | 101498229 A | 8/2009 | |
| CN | 201318146 Y | 9/2009 | |
| | | (Continued) | |

OTHER PUBLICATIONS

International Preliminary Search Report and Written Opinion for corresponding International Application No. PCT/US2023/012183 mailed Sep. 12, 2024.
(Continued)

*Primary Examiner* — Youngsul Jeong
(74) *Attorney, Agent, or Firm* — K&L Gates LLP

(57) ABSTRACT

A separator for a gas production facility includes a vessel defining an interior chamber. The vessel is designed to operate at a pressure greater than a pressure of a fluid being produced from a wellbore, the fluid including liquid, gas, sand and debris. The separator includes an inlet through which the fluid being produced from the wellbore is directed into the vessel, an electronically controlled valve in fluid communication with a lower portion of the vessel, and an outlet through which the gas is directed out of the vessel at a pressure substantially equal to the pressure of the fluid being produced from the wellbore. The separator includes a controller programmed to open, close, or modulate the electronically controlled valve to regulate flow of the liquid, sand and debris out of the lower portion of the vessel in
(Continued)

response to a level of the liquid detected within the interior chamber.

27 Claims, 22 Drawing Sheets

(52) U.S. Cl.
  CPC ........... B01D 21/245 (2013.01); B01D 21/34 (2013.01); B01D 2221/04 (2013.01)

(56) References Cited

U.S. PATENT DOCUMENTS

| | | | |
|---|---|---|---|
| 3,808,794 | A | 5/1974 | Wood |
| 4,024,912 | A | 5/1977 | Hamrick et al. |
| 4,139,019 | A | 2/1979 | Bresie et al. |
| 4,169,506 | A | 10/1979 | Berry |
| 4,213,476 | A | 7/1980 | Bresie et al. |
| 4,233,154 | A | 11/1980 | Presley |
| 4,369,373 | A | 1/1983 | Wiseman |
| 4,479,546 | A | 10/1984 | Bresie et al. |
| 4,483,376 | A | 11/1984 | Bresie et al. |
| 4,579,565 | A | 4/1986 | Heath |
| 5,117,908 | A | 6/1992 | Hofman |
| 5,205,310 | A | 4/1993 | Kolpak et al. |
| 5,988,283 | A * | 11/1999 | Gann ...................... E21B 43/34 |
| | | | 210/182 |
| 6,085,546 | A | 7/2000 | Johnston |
| 6,155,047 | A | 12/2000 | Streetman |
| 6,269,656 | B1 | 8/2001 | Johnston |
| 6,401,838 | B1 | 6/2002 | Rezmer-Cooper |
| 6,824,347 | B2 | 11/2004 | Maloney |
| 6,825,575 | B1 | 11/2004 | Edelson |
| 6,901,735 | B2 | 6/2005 | Lohn |
| 6,955,704 | B1 | 10/2005 | Strahan |
| 6,998,724 | B2 | 2/2006 | Johansen et al. |
| 7,048,782 | B1 | 5/2006 | Couch et al. |
| 7,219,512 | B1 | 5/2007 | Wilding et al. |
| 7,224,080 | B2 | 5/2007 | Smestad |
| 7,562,708 | B2 | 7/2009 | Cogliandro et al. |
| 7,575,073 | B2 * | 8/2009 | Swartout ............... E21B 21/065 |
| | | | 175/212 |
| 7,575,672 | B1 | 8/2009 | Gilmore |
| 7,578,142 | B2 | 8/2009 | Vasiljev et al. |
| 7,608,935 | B2 | 10/2009 | Scherzer |
| 7,683,499 | B2 | 3/2010 | Saucier |
| 7,958,716 | B2 | 6/2011 | Ziegenfuss |
| 8,375,717 | B2 | 2/2013 | Lourenco et al. |
| 8,421,258 | B2 | 4/2013 | Pozivil et al. |
| 8,439,112 | B1 | 5/2013 | Droke |
| 8,680,704 | B1 | 3/2014 | Rooney |
| 8,882,438 | B2 | 11/2014 | Asti et al. |
| 8,997,904 | B2 | 4/2015 | Cryer et al. |
| 9,077,220 | B2 | 7/2015 | Kyle et al. |
| 9,083,213 | B1 | 7/2015 | Nestor et al. |
| 9,217,422 | B2 | 12/2015 | Davis |
| 9,243,498 | B2 | 1/2016 | Oxner |
| 9,394,764 | B2 | 7/2016 | Favilli et al. |
| 9,937,442 | B2 | 4/2018 | Hendrix |
| 10,267,106 | B2 * | 4/2019 | Foret .................... B23K 10/006 |
| 10,458,206 | B2 | 10/2019 | Al-Dossary et al. |
| 10,513,899 | B2 | 12/2019 | Cherewyk |
| 10,612,357 | B2 | 4/2020 | Babcock et al. |
| 10,655,434 | B2 | 5/2020 | Weflen |
| 10,871,062 | B2 | 12/2020 | Gamarra et al. |
| 10,874,979 | B2 | 12/2020 | Ding et al. |
| 10,895,141 | B2 | 1/2021 | Elmer |
| 11,136,874 | B2 | 10/2021 | Arefjord et al. |
| 11,506,006 | B2 | 11/2022 | Lymberopoulos et al. |
| 2001/0003247 | A1 | 6/2001 | Lundberg |
| 2004/0217050 | A1 | 11/2004 | Schmidt et al. |
| 2006/0070735 | A1 | 4/2006 | Guerra et al. |
| 2006/0108808 | A1 | 5/2006 | Chen |
| 2007/0269317 | A1 * | 11/2007 | Clancy ................. F04B 39/123 |
| | | | 417/54 |
| 2008/0017369 | A1 | 1/2008 | Sarada |
| 2010/0077752 | A1 | 4/2010 | Papile |
| 2011/0114389 | A1 * | 5/2011 | Mathena ................ F23G 7/085 |
| | | | 96/218 |
| 2011/0175358 | A1 | 7/2011 | Langson |
| 2011/0198080 | A1 | 8/2011 | Demong |
| 2012/0000643 | A1 | 1/2012 | Bruun et al. |
| 2012/0193103 | A1 | 8/2012 | Hall et al. |
| 2013/0119666 | A1 | 5/2013 | Holt et al. |
| 2014/0265326 | A1 | 9/2014 | Allen |
| 2015/0033792 | A1 | 2/2015 | Lissianski et al. |
| 2015/0167413 | A1 * | 6/2015 | Leuchtenberg ....... E21B 21/106 |
| | | | 166/357 |
| 2015/0323357 | A1 | 11/2015 | Foster et al. |
| 2015/0345258 | A1 | 12/2015 | Sanborn et al. |
| 2016/0008742 | A1 | 1/2016 | Adler et al. |
| 2016/0129371 | A1 | 5/2016 | Black |
| 2016/0138955 | A1 | 5/2016 | Van Der Bos et al. |
| 2018/0163528 | A1 | 6/2018 | Smith et al. |
| 2018/0333657 | A1 | 11/2018 | Lyon |
| 2019/0063203 | A1 * | 2/2019 | Arefjord ................ E21B 43/34 |
| 2019/0225891 | A1 | 7/2019 | Suppiah et al. |
| 2020/0056468 | A1 | 2/2020 | MacLeod |
| 2020/0103146 | A1 | 4/2020 | Tunkel et al. |
| 2022/0074653 | A1 | 3/2022 | Hoffman |
| 2023/0073208 | A1 | 3/2023 | Egeland |

FOREIGN PATENT DOCUMENTS

| | | |
|---|---|---|
| CN | 204387691 U | 6/2015 |
| CN | 105673263 A | 6/2016 |
| CN | 107796457 A | 3/2018 |
| CN | 108034468 A | 5/2018 |
| CN | 109372686 A | 2/2019 |
| CN | 109519160 A | 3/2019 |
| CN | 209510515 U | 10/2019 |
| CN | 111188609 A | 5/2020 |
| JP | 2021-021500 A2 | 2/2021 |
| KR | 10-2009-0099315 A | 9/2009 |
| KR | 10-2016-0139674 A | 12/2016 |
| KR | 10-2023-0027364 A | 2/2023 |
| RU | 2270396 C1 | 1/2006 |
| WO | 2003/081038 A1 | 10/2003 |
| WO | WO-2014018585 A1 * | 1/2014 ............ E21B 43/34 |
| WO | 2021/105725 A1 | 6/2021 |
| WO | 2021151515 A1 | 8/2021 |

OTHER PUBLICATIONS

Alpha FlowBack, Euipment Listing, Alpha Flowback Corp, https://alphaflowback.com/equipment/, 2023.
International Search Report and Written Opinion issued in related PCT Application No. PCT/US2021/054214 mailed Jan. 28, 2022, 17 pages.
Rahman, Mohammed Mahbubur. "Power generation from pressure reduction in the natural gas supply chain in Bangladesh." Journal of Mechanical Engineering 41.2 (2010): 89-95.
Retnanto, Albertus, and Mohamed Idris. "An Energy Harvesting Alternative to Wellhead Gas Chokes."
Xiao, Jinjiang X., et al. "Well Site Energy Harvesting from High-Pressure Gas Production." Saudi Aramco Journal of Technology (2014).
Rose, Marlee, "High Pressure Separators for Oil & Natural Gas Production" found at https://medium.com/@marleerosegreasebook/high-pressure-separators-for-oil-natural-gas-production-830301af0b46, 2017, 7 pages.
Dorsett, L. R. "LTX: Realization of Proven Technology." SPE Gas Technology Symposium. SPE Paper 19080 (1989).
Enercorp, "Enercorp's Sahara Advanced Cyclone Technology Captures 99.7% of Sand in the Permian Basin", found at https://enercorp.net/permian-basin-flowback-case-study/, 4 pages.
SOR Inc., "1400 Series Control Valves" found at https://www.sorinc.com/assets/images/uploads/2017/04/1400-Series-Control-Valves_CAT1639.pdf, Apr. 2018, 14 pages.

(56)  References Cited

OTHER PUBLICATIONS

Notification of transmittal of the international search report and the written opinion of the international searching authority, or the declaration, PCT Application No. PCT/US2024/016004, mailed Jun. 4, 2024, 11 pages.
Supplementary European Search Report for corresponding European Patent Application No. EP21878634 dated Sep. 18, 2024.

* cited by examiner

6000

602 — INITIATE FLOW FROM WELL BORE TO SEPARATOR

604 — DETERMINE LIQUID LEVEL WITHIN SEPARATOR

606 — OPEN, MODULATE, OR CLOSE VALVE

608 — CONFIRM PROPER LIQUID LEVEL

610 — CLOSE SHUTOFF VALVE

APPARATUS AND METHOD FOR HARNESSING ENERGY FROM A WELLBORE TO PERFORM MULTIPLE FUNCTIONS WHILE REDUCING EMISSIONS

CROSS-REFERENCE TO RELATED APPLICATIONS

The present disclosure claims priority to and the benefit of Provisional Patent Application Ser. No. 63/089,777, entitled "Separator for Gas Production Units," filed on Oct. 9, 2020.

TECHNICAL FIELD

The present invention relates to separators, gas production units and methods for separating gas from liquid, sand and debris being produced from oil and gas wells and more particularly to such devices used to facilitate the production of natural gas and emissions-free or near emissions-free energy for use in the production of LNG (liquid natural gas), CNG (compressed natural gas), electricity, hydrogen and oxygen.

BACKGROUND

Modern natural gas and oil wells generate tremendous pressure. In some instances, these pressures can approach 20,000 PSIG. Transporting natural gas via pipeline at these pressures is inconceivable, not only because of the tremendous thickness the pipeline would have to be, but primarily because not all wells can produce at these pressures, particularly as they are depleted. In the United States, the general pressure that transmission pipelines operate at is approximately 1,000 PSIG or even lower in the case of field gathering systems. Pipelines, compressors and processing equipment, and generally the industry as a whole has adopted and targeted this standard pressure range of approximately 1,000 PSIG. Because of this, the approach of modern natural gas and oil well production and flowback equipment is to employ designs that safely separate and reduce wellhead gas pressure to pipeline pressure, roughly 1,000 PSIG or less, and to safely reduce the wellhead pressure to near atmospheric pressure for the separated oil, water and other sand or debris to be placed in tanks on location.

Conventional technology often uses a single valve, commonly a choke valve, to reduce the pressure of the entire, collective output of the well. This often requires heat to negate the cooling effect, or more formerly the Jules Thompson (JT) effect associated with reducing the pressure of the gas produced. In practical terms, energy in the form of burning natural gas is used to neutralize the energy in the form of cooling associated with this pressure reduction (which, as noted, could be as high as 20,000 PSIG down to pipeline pressures of 1,000 PSIG or lower). Because natural gas is burned as part of this process, emissions are also generated. Further, energy in the form of natural gas or electricity is consumed as the gas is transported via pipelines, and through multiple stages of compression, to central facilities where yet more energy is needed to generate compressed natural gas (CNG), liquid natural gas (LNG) and electricity that can be used to produce other derivatives like hydrogen. The additional energy needed to generate these products add equipment, cost and an environmental footprint to the production of these products.

Many CNG facilities, for example, source their natural gas from distribution pipelines that operate under 100 PSIG. There are tremendous inefficiencies and also emissions associated with reducing the pressure of a well from 20,000 PSIG to 1,000 PSIG, transporting the gas many miles, compressing it multiple times along the way, only to reduce the pressure to 100 PSIG and then back up to 3,600 PSIG, the customary pressure of CNG. Likewise, LNG is typically generated in large central facilities that use a tremendous amount of energy to cryogenically cool the gas, using the Jules Thompson effect, in order for it to liquify the gas. Similar to the inefficiencies of CNG, there are tremendous inefficiencies and carbon emissions associated with reducing the pressure of a well from 20,000 PSIG to 1,000 PSIG, transporting the gas many miles, compressing it multiple times along the way, to a central facility where more energy is consumed to generate a pressure drop, in order to cryogenically cool the gas to liquify it. In other words, to produce the well, energy is used to combat the Jules Thompson effect, energy is used to transport the gas to a central facility, and even more energy is used to employ the Jules Thompson effect to liquify the gas.

Many natural gas well sites utilize two primary devices to condition the gas and fluids produced from each well for delivery into the pipeline leaving the well site. The first of these devices, known in the art as gas production units (GPUs), remove liquids (such as water and/or oil) from the produced gas. The GPU also conditions the pressure of gas and liquid exiting the well to be accepted by the pipeline or local tanks, in the case of liquid. Prior to the gas and liquid entering the GPU, the second device, a separate vessel known as a sand separator is employed. This device captures any sand or debris from the well in order to prevent damage to operating components of the GPU. Sand and debris control is a critical element of well production, as the pressures and flow rates experienced by modern gas wells combined with the erosive and mechanical fouling effects of the sand and debris can have catastrophic implications. A typical gas production facility including a sand separator 10 and a GPU 20 is shown in FIG. 1. The GPU 20 is often equipped with a choke valve that drops the gas and liquid pressure from, for example approximately 5,000 psi at the wellhead and sand separator 10 to approximately 1,400 psi or below at the exit of the GPU 20. This pressure drop within the GPU creates a chilling effect that is mitigated by the gas and liquid travelling through a set of coils before and after the choke valve. The coils may be submerged in glycol heated by a burner.

Existing sand separators and GPUs have many disadvantages and limitations including a large footprint, increased capital expense requirements for redundant vessels associated with the GPU and sand separator, manual dumping of sand and debris from the sand separator, unsophisticated and unreliable fluid-level monitoring and control, unintelligent and unreliable modulation of valves for removing fluid and sand from the system, limited process flowrates, reliance on third party vendors for flowback operations, and significant man-hour and maintenance requirements. Because of the lack of reliability of the current methods and lack of electrical feedback that the equipment is operating properly, a third vessel or polishing vessel have, in certain instances, been employed to capture any fluid not captured by the GPU.

More particularly, existing sand separators 10 and GPUs 20 have limited flow capacities that cannot handle the initial fluid and sand volume coming out of the wellbore. As such, temporary flowback equipment is employed to handle the initial fluid, sand and debris from the wellbore prior to the use of the permanent sand separator 10 and the GPU 20. Flowback equipment, or spreads, are typically furnished by third party vendors, and add substantial cost and time to the production process.

Moreover, existing sand separators 10 allow sand and debris to collect within the separator 10, which can cause clogging when the sand is later drained. Still further, if the sand is not drained on a frequent enough basis, sand and debris is allowed to carry over into the GPU damaging its components. Because sand production from the well is random and there is little way of knowing the sand level in the sand separator, establishing a precise draining frequency is not possible. As a result, and because of the damage sand and debris has on the GPU, significant labor is necessary to manually dump the vessel on a more frequent cycle than would otherwise be required.

Moreover, existing devices experience erosion throughout the entire flow path. Because of the unreliable and imprecise nature of sand separation, sand tends to travel with the liquid and gas damaging all equipment it encounters. By substantially removing all fluid, sand, and debris immediately downstream of the wellhead, the piping downstream of the separator is no longer subject to erosion. This reduces the cost of downstream piping by eliminating the need for additional pipe wall thickness (erosion allowance), cushioned tee and elbows, etc. It also reduces maintenance and the need to replace piping that has been eroded.

Moreover, existing devices do not provide real-time feedback or precision control of the separation process. As a result, if a GPU were to malfunction and the fluid dump fail closed, water is allowed into the pipeline and ultimately transmitted to the downstream compressor station. In this scenario, there is no way of knowing what pad or what well on what pad the GPU is malfunctioning on. Additionally, if a GPU were to malfunction and the fluid dump stick open, gas would be allowed to escape into the fluid tanks on the well pad and ultimately into the atmosphere

SUMMARY

Embodiments of the present disclosure are generally directed to a separator fluidly connected to an unrestricted wellbore. In some non-limiting embodiments, the separator includes a vessel defining an interior chamber. The vessel is capable of operating at a pressure greater than the pressure of a fluid being produced from the unrestricted wellbore, the fluid including liquid, gas, sand and debris. The separator further includes an inlet through which the fluid being produced from the unrestricted wellbore is directed into the vessel. The separator further includes an outlet through which the gas is directed out of the vessel at a pressure substantially equal to the pressure of the fluid being produced from the unrestricted wellbore. The separator further includes at least one liquid level sensor capable of detecting a level of liquid within the interior chamber of the vessel at the pressure of the fluid being produced from the unrestricted wellbore. The separator further includes an electronically controlled valve in fluid communication with a lower portion of the vessel. The separator further includes a controller connected to the at least one liquid level sensor and the electronically controlled valve, the controller programmed to open, close, or modulate the electronically controlled valve to regulate the combined flow of the liquid, sand and debris out of the lower portion of the vessel at least partially in response to the level of the liquid in the interior chamber of the vessel detected by the at least one liquid level sensor.

In some non-limiting embodiments, the controller is programmed to open, close, and/or modulate the electronically controlled valve to maintain a predetermined liquid level in the interior chamber of the vessel.

In some non-limiting embodiments, the separator further includes a bridle in fluid connection with the interior chamber of the vessel, wherein the at least one liquid level sensor is disposed within the bridle.

In some non-limiting embodiments, the vessel further includes one or more ports in fluid connection with the bridle to allow equalization of the liquid level between the bridle and the interior chamber of the vessel.

In some non-limiting embodiments, a bottom portion of the bridle is oriented at an angle to the interior chamber of the vessel.

In some non-limiting embodiments, a top portion of the bridle is fluidly connected to outlet piping at a top of the vessel.

In some non-limiting embodiments, the separator further includes a drain line extending from the bridle to a location downstream of the electronically controlled valve, the drain line being coupled to a valve.

In some non-limiting embodiments, the at least one liquid level sensor is disposed within the vessel.

In some non-limiting embodiments, the at least one liquid level sensor includes a guided wave radar sensor.

In some non-limiting embodiments, the at least one liquid level sensor includes a differential pressure sensor.

In some non-limiting embodiments, the separator further includes at least one limit sensor for indicating that the level of the liquid is above or below a predetermined set point within the interior chamber of the vessel.

In some non-limiting embodiments, the at least one limit sensor includes an upper limit sensor for indicating that the level of the liquid is above a predetermined high point within the interior chamber.

In some non-limiting embodiments, the at least one limit sensor includes a lower limit sensor for indicating that the level of the liquid is below a predetermined low point within the interior chamber.

In some non-limiting embodiments, the separator further includes a first density sensor for indicating the density of the fluid within the interior chamber of the vessel, and a second density sensor located downstream of the electronically controlled valve for indicating a flow rate and/or density of the fluid output from the vessel.

In some non-limiting embodiments, the separator further includes a pressure sensor for indicating the pressure of the fluid downstream of the electronically controlled valve.

In some non-limiting embodiments, the controller is programmed to operate and provide feedback to an operator in or substantially near real-time.

In some non-limiting embodiments, the electronically controlled valve includes a dump valve.

In some non-limiting embodiments, the dump valve is configured to be selectively operated in a hand mode and/or the controller is programmed to allow operation of the dump valve in a fixed position.

In some non-limiting embodiments, the separator further includes an ESD valve connected downstream of the dump valve, wherein the ESD valve is connected to the controller and electronically controlled to close under certain conditions.

In some non-limiting embodiments, the separator further includes a strainer disposed upstream of the dump valve for removing larger debris particles but permitting sand and small debris particles to pass through the dump valve.

In some non-limiting embodiments, the inlet includes a tube extending into the interior chamber of the vessel with a terminal end of the tube being partially obstructed by a baffle adapted to direct the incoming fluid to the bottom of the interior chamber.

In some non-limiting embodiments, the separator further includes a diffuser disposed in the interior chamber of the vessel, the diffuser adapted to generally direct the gas upward and direct the sand and the debris downward within the vessel.

In some non-limiting embodiments, the separator further includes a shutoff valve in fluid communication with, and upstream of, the inlet and electronically connected to the controller, the controller being programmed to open, close and/or modulate the shutoff valve to control the flow of the fluid produced from the wellbore being directed into the vessel.

In some non-limiting embodiments, the outlet is disposed at the top of the vessel.

In some non-limiting embodiments, the separator further includes a valve position sensor for indicating an operational position of the electronically controlled valve, the valve position sensor connected to the controller for providing feedback of the operational position of the electronically controlled valve to the controller.

In some non-limiting embodiments, the separator further includes a second electronically controlled valve downstream of the outlet, a bypass flowline extending from the outlet to a location downstream of the second electronically controlled valve, and a bypass valve in the bypass flowline for selectively controlling flow of the gas through the bypass flowline.

Other embodiments of the present disclosure are directed to a gas production facility. In some non-limiting embodiments, the gas production facility includes a separator that includes a vessel defining an interior chamber. The vessel is designed to operate at a pressure greater than the pressure of a fluid being produced from an unrestricted wellbore, the fluid including liquid, gas, sand and debris. The separator further includes an inlet through which the fluid being produced from the wellbore is directed into the vessel. The separator further includes an outlet through which the gas is directed out of the vessel at a pressure substantially equal to the pressure of the fluid being produced from the unrestricted wellbore. The separator further includes at least one liquid level sensor adapted to detect the level of liquid within the interior chamber of the vessel at the pressure of the fluid being produced from the unrestricted wellbore. The separator further includes an electronically controlled valve in fluid communication with a lower portion of the vessel. The separator further includes a controller connected to the at least one liquid level sensor and the electronically controlled valve, the controller programmed to open, close, or modulate the electronically controlled valve to regulate the combined flow of the liquid, sand and debris out of the lower portion of the vessel in response to a level of the liquid in the interior chamber of the vessel detected by the at least one liquid level sensor. The gas production facility further includes a line heater for heating the gas as it exits the separator, and a choke for reducing a pressure of the gas as it exits the line heater.

In some non-limiting embodiments, the gas production facility includes a separator unit including two separators as described above, the two separators being disposed proximate each other and connected in series or in parallel.

In some non-limiting embodiments, each of the separators is connected to a separate wellhead and separate choke downstream of the separate wellhead and wherein both separators are connected to the line heater.

In some non-limiting embodiments, the gas production facility further includes a sand vessel located downstream of the electronically controlled valve for separating the sand from the flow of the liquid, sand and debris.

In some non-limiting embodiments, the gas production facility further includes a gun barrel separator located downstream of the electronically controlled valve for separating oil and water.

Other embodiments of the present disclosure are directed to a separator fluidly connected to a wellbore. The separator includes a vessel defining an interior chamber. The separator further includes an inlet for delivering fluid being produced from a wellbore into the vessel at a first pressure, the fluid including liquid, sand, gas and debris. The separator further includes an outlet through which gas is directed out of the vessel at a pressure substantially equal to the first pressure. The separator further includes at least one liquid level sensor capable of detecting the level of liquid within the interior chamber of the vessel. The separator further includes an electronically controlled valve in fluid communication with a lower portion of the vessel. The separator further includes a controller connected to the at least one liquid level sensor and the electronically controlled valve and programmed to open, close, or modulate the electronically controlled valve to regulate the combined flow of the liquid, sand and debris out of the lower portion of the vessel at least partially in response to a level of the liquid in the interior chamber of the vessel detected by the at least one liquid level sensor.

In some non-limiting embodiments, the first pressure is an unregulated pressure of the fluid flowing from the wellbore.

In some non-limiting embodiments, the first pressure is regulated via a pressure control valve between the wellbore and the separator.

In some non-limiting embodiments, the first pressure is at least 1,500 psi.

Other embodiments of the present disclosure are directed to a method for producing a pressurized natural gas stream from a fluid being produced from a wellbore, the fluid including liquid, gas, sand and debris. The method includes directing the fluid into a separator at a pressure substantially equal to the pressure of the fluid being produced from the wellbore. The method further includes directing the gas out of the separator at a pressure substantially equal to the pressure of the wellbore. The method further includes controlling the level of the liquid in the separator between two predetermined set points by regulating the flow of the liquid, sand and other solid debris out of a lower portion of the separator and/or by regulating the flow rate of the gas out of the separator.

In some non-limiting embodiments, the method further includes regulating the flow of the fluid being produced from the wellbore into the separator.

In some non-limiting embodiments, the method further includes maintaining one of (a) a predetermined level of the liquid in the separator by opening, closing, and/or modulating an electronically controlled valve connected to a controller in fluid communication with the separator to regulate the combined flow of the liquid, sand and debris from the lower portion of the separator, or (b) a predetermined fixed flow rate of liquid, sand and debris passing through the electronically controlled valve.

In some non-limiting embodiments, the method further includes providing, via the controller, at least substantially real-time feedback to an operator of the level of the liquid in the separator.

In some non-limiting embodiments, the method further includes determining the liquid level in the separator using a liquid level sensor electronically connected to the controller, and opening, closing, and/or modulating the electronically controlled valve using the electronic controller to regulate the combined flow of the liquid, sand and debris from the lower portion of the separator and thereby maintain the predetermined liquid level.

In some non-limiting embodiments, the method further includes determining whether the liquid level is above or below a predetermined set point in the separator, initiating the flow of the liquid, sand and debris out of the lower portion of the separator if the liquid level is above the predetermined set point, and ceasing the combined flow of the liquid, sand and debris out of the lower portion of the separator if the set point is below the predetermined set point.

In some non-limiting embodiments, the method further includes transmitting the gas from the separator to a line heater and choke.

In some non-limiting embodiments, the method further includes closing the electronically controlled valve where the pressure or density of the combined flow of the liquid, sand and debris from the lower portion of the separator reaches a certain predetermined value or if the electronically controlled valve has experienced erosion.

Other embodiments of the present disclosure are directed to a system including a separator that includes an inlet for delivering fluid being produced from a wellbore into the separator at a first pressure, the fluid including liquid, gas, sand and debris. The separator further includes an outlet for delivering gas separated from the liquid, sand and debris out of the separator at substantially the same pressure. The system further includes a molecular dryer connected to the outlet of the separator, the molecular dryer having an outlet through which the gas substantially removed of water vapor is directed out of the molecular dryer at a second pressure that is substantially the same as the first pressure. The system further includes a turbo expander connected to the outlet of the molecular dryer, the turbo expander being powered by the gas pressure directed out of the molecular dryer and generating both electricity and a reduced temperature gas substantially removed of water vapor from the gas being directed out of the molecular dryer.

In some non-limiting embodiments, the system of the present disclosure harnesses energy, that has been historically wasted, to generate CNG, LNG and electricity, and through electrolysis, hydrogen and oxygen, through use of the turbo expanders and as further explained below optionally also a hydroelectric turbine. These embodiments utilize the gas to produce these additional products in an emission-free or near emission-free way.

In some non-limiting embodiments, the separator further includes a vessel defining an interior chamber, an electronically controlled valve in fluid communication with a lower portion of the vessel, and a controller connected to the electronically controlled valve and programmed to open, close, or modulate the electronically controlled valve to regulate the flow of the liquid, sand and debris out of the lower portion of the vessel in response to a level of the liquid detected within the interior chamber of the vessel.

In some non-limiting embodiments, the system further includes a compressed natural gas filling station connected to the outlet of the molecular dryer or a second outlet of the molecular dryer to dispense naturally compressed natural gas.

In some non-limiting embodiments, the system further includes a pressure control valve disposed between the compressed natural gas filling station and the molecular dryer for reducing the pressure of the gas being directed out of the molecular dryer from the second pressure to a third pressure, wherein the third pressure is lower than the second pressure.

In some non-limiting embodiments, the system further includes a compressed natural gas filling station connected to an outlet of the turbo expander, the turbo expander connected between the compressed natural gas filling station and the molecular dryer for generating mechanical energy as the gas being directed out of the molecular dryer is reduced from the second pressure to a third pressure, wherein the third pressure is lower than the second pressure, for the subsequent production of additional end products from the gas being directed out of the molecular dryer.

In some non-limiting embodiments, the system further includes a pressure control valve disposed between the outlet of the molecular dryer and the turbo expander for reducing the pressure of the gas being directed out of the molecular dryer from the second pressure to a third pressure, wherein the third pressure is lower than the second pressure.

In some non-limiting embodiments, the system further includes a second turbo expander disposed between the outlet of the molecular dryer and the turbo expander for reducing the pressure of the gas being directed out of the molecular dryer from the second pressure to a third pressure, wherein the third pressure is lower than the second pressure.

In some non-limiting embodiments, the system further includes a gas pipeline delivering natural gas to a natural gas grid connected to at least one of the molecular dryer or the turbo expander.

In some non-limiting embodiments, the gas pipeline is connected to the molecular dryer and a pressure control valve is connected between the gas pipeline and the molecular dryer for reducing the pressure of the gas being directed out of the molecular dryer from the second pressure to a third pressure, wherein the third pressure is lower than the second pressure and substantially equal to a pipeline pressure at which the natural gas grid supplies gas to a recipient.

In some non-limiting embodiments, the turbo expander is connected between the gas pipeline and the molecular dryer for reducing the pressure of the gas being directed through the turbo expander to a third pressure, wherein the third pressure is lower than the second pressure and substantially equal to a pipeline pressure at which the natural gas grid supplies gas to a recipient.

In some non-limiting embodiments, the system further includes a cold box connected to one of the molecular dryer and the turbo expander, the cold box cryogenically cooling gas exiting the one of the molecular dryer and the turbo expander so as to produce liquid natural gas at a third pressure, wherein the third pressure is lower than the second pressure.

In some non-limiting embodiments, the turbo expander includes a cooling fluid outlet through which the reduced temperature gas generated by the operation of the turbo expander is directed out of the turbo expander, wherein the cold box is connected to the cooling fluid outlet to receive the reduced temperature gas for cryogenically cooling the gas exiting one of the molecular dryer and the turbo expander.

In some non-limiting embodiments, the turbo expander produces power, which is used for local power consumption and/or supplying power to an electrical power grid.

In some non-limiting embodiments, the turbo expander generates power, which is used in an electrolysis process to separate water into hydrogen and oxygen.

In some non-limiting embodiments, the hydrogen and the oxygen produced from the electrolysis process are fed into the cold box, and the cold box liquifies the hydrogen and oxygen.

In some non-limiting embodiments, the hydrogen and the oxygen fed into the cold box are further fed into an auxiliary chiller to produce one or both of liquid hydrogen and liquid oxygen.

In some non-limiting embodiments, the auxiliary chiller cools the oxygen to approximately −297° F. and cools the hydrogen to approximately −423° F.

In some non-limiting embodiments, the system further includes a compressor into which the hydrogen is fed, which compresses the hydrogen for subsequent transport via a truck or pipeline.

In some non-limiting embodiments, the turbo expander is connected to a gas compressor.

In some non-limiting embodiments, the separator includes a second outlet through which the liquid, sand and debris is delivered out of the separator, the system further including a mechanism for removing solids from the liquid, sand and debris being delivered out of the separator and a hydroelectric turbine connected to the mechanism for removing solids, the hydroelectric turbine being adapted to generate electricity from the resultant liquid exiting the mechanism for removing solids.

In some non-limiting embodiments, at least one pressure control valve and/or the turbo expander is disposed between the molecular dryer and a compressed natural gas filling station for reducing the pressure of the gas separated from the liquid, sand and debris delivered out of the separator from the second pressure to a third pressure, which is lower than the second pressure, wherein the pressure differential between the second pressure and the third pressure is used to generate mechanical energy and/or a cooling effect.

In some non-limiting embodiments, the system further includes a cold box connected to an output of the pressure control valve and/or turbo expander and which is supplied with the cooling effect.

In some non-limiting embodiments, the system further includes at least one pressure control valve and/or a turbo expander, disposed between the compressed natural gas filling station and a pipeline connection, for reducing the pressure of the gas from the third pressure to a fourth pressure, which is lower than the third pressure, wherein the pressure differential between the third pressure and fourth pressure is used to generate mechanical energy and/or a cooling effect.

In some non-limiting embodiments, the system further includes a cold box connected to an output of the pressure control valve and/or turbo expander disposed between the compressed natural gas filling station and the pipeline connection and which is supplied with the cooling effect.

In some non-limiting embodiments, the system further includes at least one pressure control valve and/or a turbo expander disposed between the pipeline connection and a cold box for reducing the pressure from the fourth pressure to a fifth pressure, which is lower than the fourth pressure, wherein the pressure differential between the fourth pressure and the fifth pressure is used to generate mechanical energy and/or a cooling effect.

Other embodiments of the present disclosure are directed to a gas production facility including a tree connected to a wellbore, the tree including at least a first outlet, a second outlet, and one or more valves configured to control the flow of fluid produced from a wellbore. The gas production facility further includes a separator. The separator includes an inlet for delivering fluid into the separator at a first pressure, the fluid including liquid, gas, sand and debris, and an outlet for delivering gas and/or reduced volume of the liquid, sand and debris out of the separator at a pressure substantially equal to the first pressure. The gas production facility further includes a first flow path connecting the first outlet of the tree to the inlet of the separator. The gas production facility further includes a gas production unit including at least a control valve for reducing, restricting and/or stopping flow of a gas or fluid flowing therethrough. The gas production facility further includes a second flow path connecting the second outlet of the tree to the gas production unit. The gas production facility further includes a third flow path connecting the outlet of the separator to the gas production unit or to the second flow path.

In some non-limiting embodiments, the gas production facility further includes a valve disposed along the third flow path.

In some non-limiting embodiments, the separator includes a vessel defining an interior chamber, an electronically controlled valve in fluid communication with a lower portion of the vessel, and a controller connected to the electronically controlled valve and programmed to open, close, and/or modulate the electronically controlled valve to regulate the flow of the liquid, sand and debris out of the lower portion of the vessel in response to a level of the liquid detected within the interior chamber of the vessel.

In some non-limiting embodiments, the gas production facility further includes a junk catcher or strainer located between the vessel and the electronically controlled valve, and a manifold located downstream of the electronically controlled valve.

In some non-limiting embodiments, the manifold is connected to an outlet of the gas production unit through which liquid, sand, and/or debris are directed out of the gas production unit.

In some non-limiting embodiments, the gas production facility includes a second separator connected in parallel with the separator on a skid, wherein the second separator is fluidly connected to a second tree connected to a second wellbore.

Other embodiments of the present disclosure are directed to a method for utilizing the energy associated with a high-pressure fluid including gas, liquid, sand and debris being produced from a wellbore. The method includes separating gas from the liquid, sand and debris. The method further includes substantially removing water vapor from the gas. The method further includes passing the gas through a turbo expander, as the gas passes through the turbo expander the pressure of the gas dropping from a first pressure to a second pressure, wherein the second pressure is lower than the first pressure. The method further includes generating mechanical energy and a cooling effect from the pressure drop of the gas passing through the turbo expander.

These and other features and characteristics of a separator, a facility including a separator, and a process for operating a separator will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular forms of "a", "an", and "the" include plural referents unless the context clearly dictates otherwise.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

For purposes of the description hereinafter, the terms "upper", "lower", "right", "left", "vertical", "horizontal", "top", "bottom", "lateral", "longitudinal", and derivatives thereof shall relate to the disclosure as it is oriented in the figures. However, it is to be understood that the disclosure may assume alternative variations and step sequences, except where expressly specified to the contrary. It is also to be understood that the specific devices and processes illustrated in the attached drawings and described in the following specification are simply exemplary aspects of the disclosure. Hence, specific dimensions and other physical characteristics related to the aspects disclosed herein are not to be considered as limiting.

As used herein, the term "psi" means pounds per square inch.

As used herein, the term "at least one of" is synonymous with "one or more of". For example, the phrase "at least one of A, B, and C" means any one of A, B, and C, or any combination of any two or more of A, B, and C. For example, "at least one of A, B, and C" includes one or more of A alone; or one or more B alone; or one or more of C alone; or one or more of A and one or more of B; or one or more of A and one or more of C; or one or more of B and one or more of C; or one or more of all of A, B, and C. Similarly, as used herein, the term "at least two of" is synonymous with "two or more of". For example, the phrase "at least two of D, E, and F" means any combination of any two or more of D, E, and F. For example, "at least two of D, E, and F" includes one or more of D and one or more of E; or one or more of D and one or more of F; or one or more of E and one or more of F; or one or more of all of D, E, and F.

Figure 6:
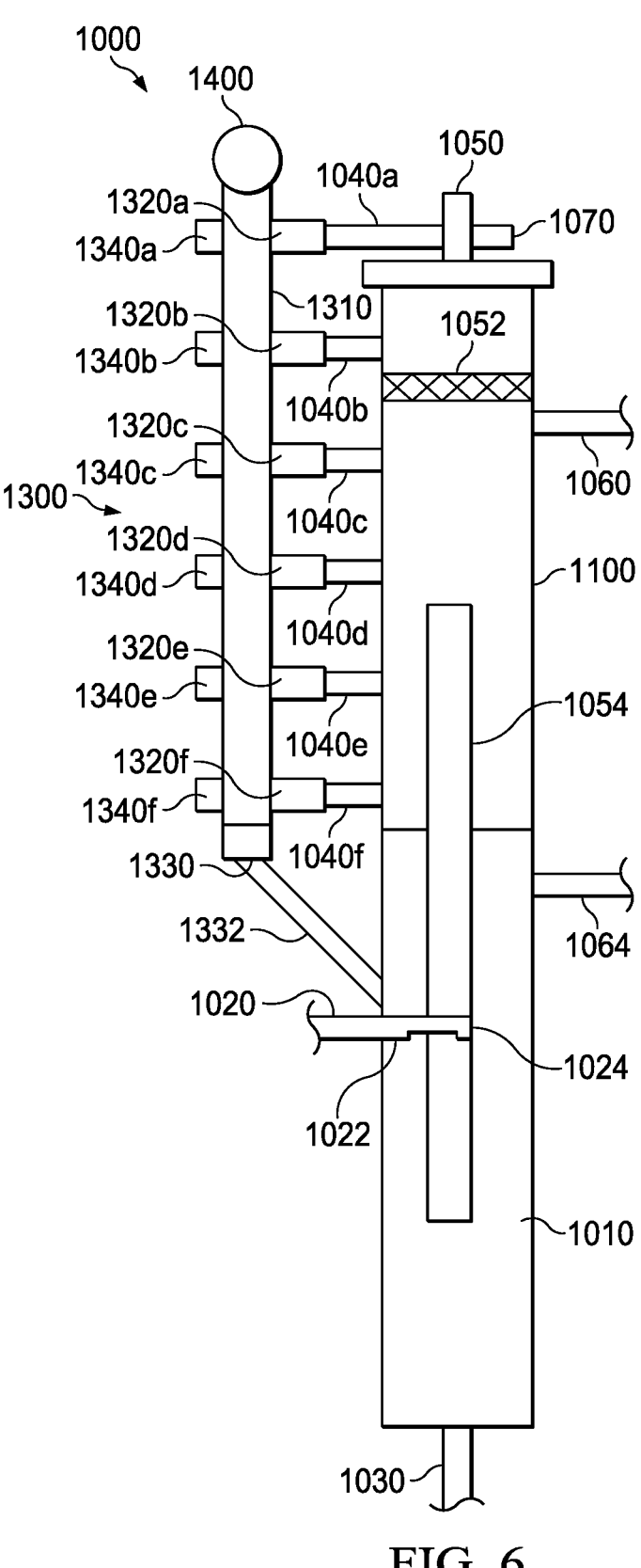
FIG. 6 is a side cross-sectional view of the separator of FIG. 2.
Figure 6A:
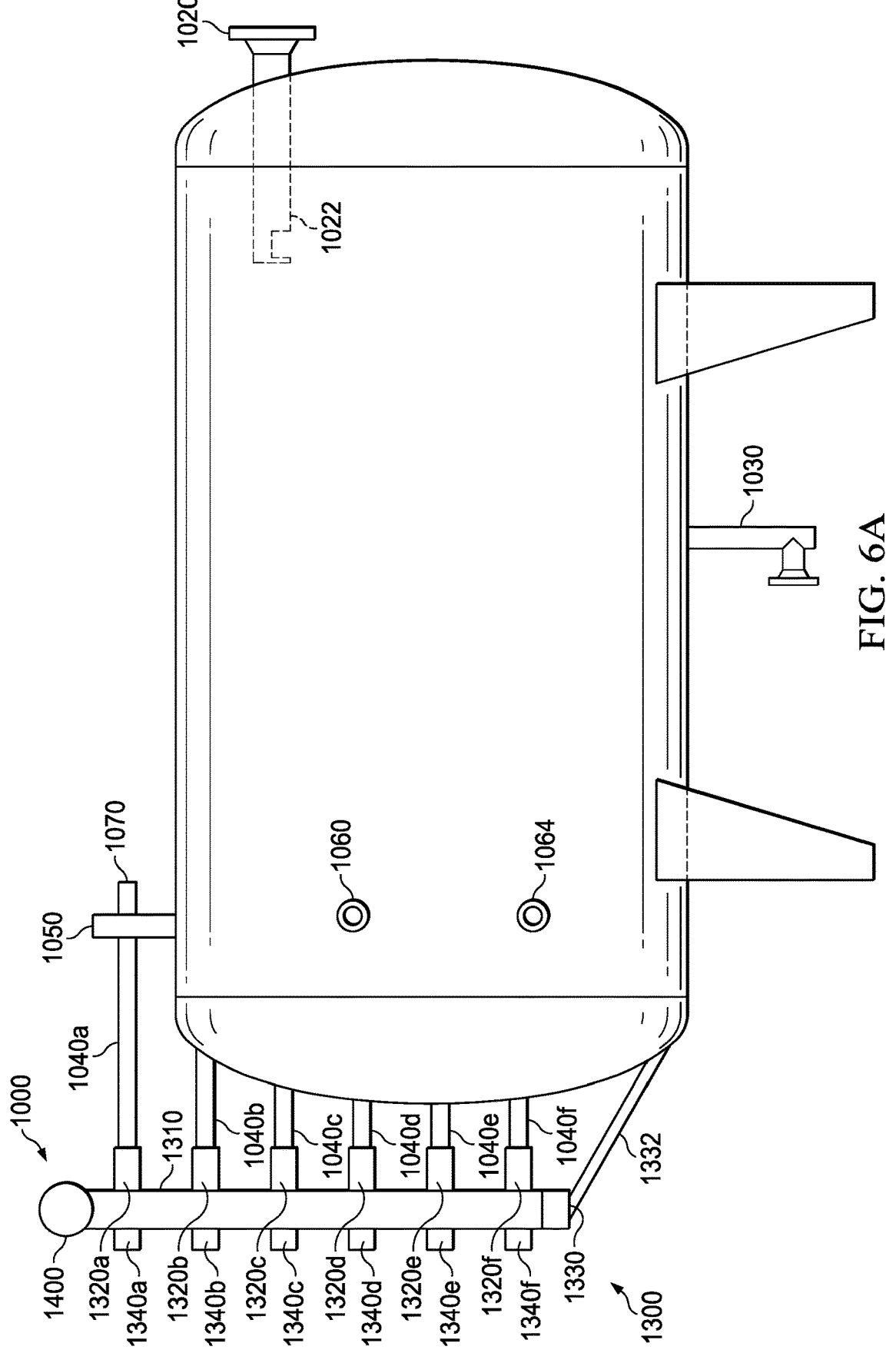
FIG. 6A is a side cross-section view of a horizontal orientation of the separator of FIG. 2.

Referring to FIGS. 2-7, embodiments of the present disclosure are directed to a sand and liquid separator 1000 (hereinafter "separator 1000") particularly adapted for use at natural gas wells. The main body 1100 of the separator 1000 is generally a hollow vessel which defines an interior chamber 1010. In the embodiment shown in the FIGS. 2-8, the main body 1100 is constructed of an upper vessel section and a lower vessel section, which together define a continuous interior chamber 1010. However, it is to be understood that the main body 1100 could be constructed from any number of sections, including one continuous, unitary section as shown in FIGS. 10-12 and 16. The main body 1100 is preferably constructed from a strong, rigid material such as steel designed, configured, or rated to operate at an incoming pressure of gas flowing directly or indirectly (e.g. through a choke) from the wellbore. In some embodiments, the separator 1000 may be rated, designed, or configured for, or be capable of, operating at gas pressures greater than approximately 1500 psi, or greater than approximately 2,500 psi, or greater than approximately 5,000 psi. In some embodiments, the separator 1000 may be rated, designed, or configured for, or be capable of, operating at gas pressures as high as or greater than an unregulated pressure at which gas flows from the wellbore. For example, unregulated gas pressure at the wellhead of Marcellus Shale formation wells may be approximately 5,000 psi, and unregulated gas pressure at the wellhead of Utica Shale formation wells may be approximately 10,000 psi. In other embodiments, the separator 1000 may be rated, designed, or configured for, or be capable of, operating at regulated gas pressures. For example, the gas pressure of a Utica Shale formation well may be regulated down from approximately 10,000 psi at the wellhead to approximately 5,000 psi before being fed to the separator 1000. Such a pressure regulation, which may be utilized to prevent damage to or failure of the various components of the separator 1000 described herein, may be achieved by a choke or other device disposed inline between the wellbore and the separator 1000. In some embodiments, the separator 1000 and the various components thereof may be designed to meet various industry standards for pressure vessels or pressure and/or technical limitations associated with instrumentation described herein. As those of ordinary skill in the art will appreciate, modifications to existing instruments and other system components (e.g., the main body 1100 of the separator 1000) can be made to accommodate the high pressures of formations such as the Utica Shale formation without the need of equipment to regulate the pressure down from that coming out of the wellbore. As those of ordinary skill in the art will appreciate, the separator 1000 can be oriented horizontally rather than vertically, as shown in FIG. 6A.

In addition, the disclosed separator 1000 allows for separation of fluid, sand and debris from the gas stream at pressures available at the wellbore, prior to gas pressure reduction. It is advantageous to maintain high gas pressure of the gas removed of fluid, sand, and debris, as this pressurized stream of gas may be used for the production of compressed natural gas (CNG), liquefied natural gas (LNG), electricity, hydrogen and/or oxygen. These products may be produced individually or simultaneously in any combination without compression and free of emissions, with or without also providing natural gas to a pipeline.

In embodiments in which the main body 1100 is constructed of multiple sections, the various sections may be connected to one another using any suitable fastening method or device, such as mechanical fasteners (e.g. bolts or rivets), a welded joint, or the like. The connection between the various sections should be sufficiently tight to prevent the escape of high pressure gas and other materials from the interior chamber 1010 to the outside environment. The main body 1100 may be supported in a generally vertical position by a frame 1002.

Figure 7:
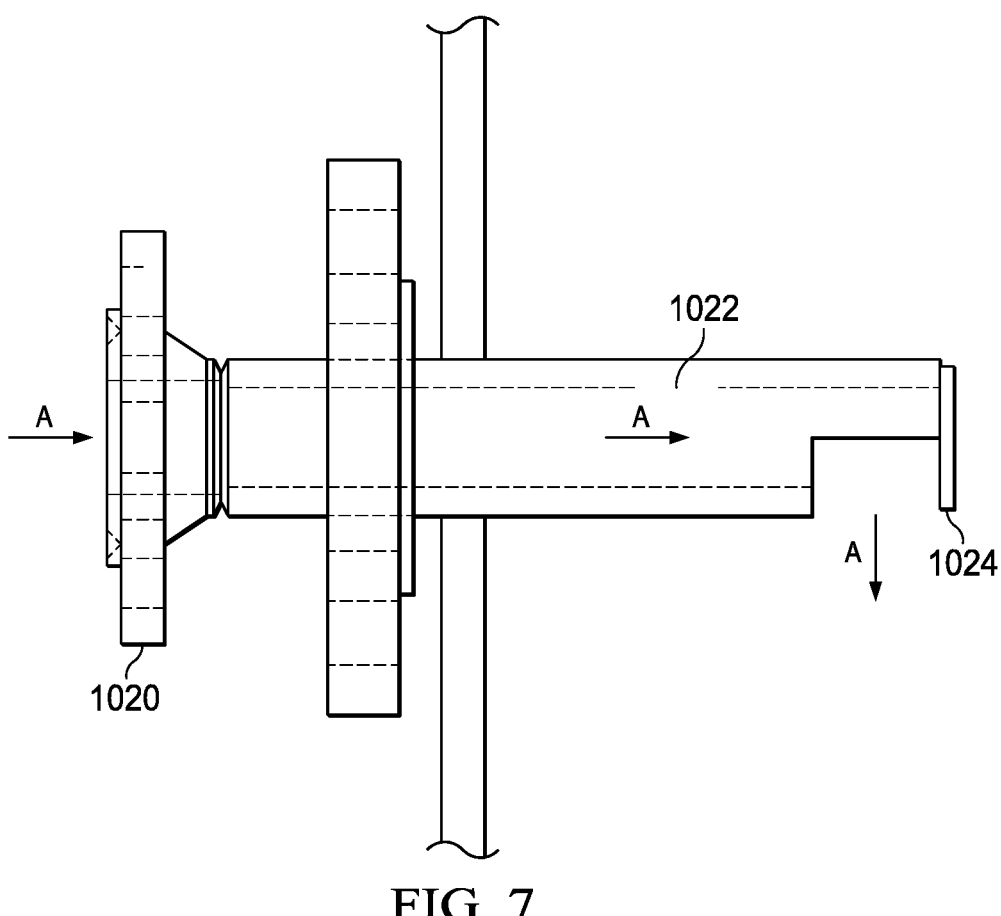
FIG. 7 is a detail view of the inlet port of the separator of FIG. 2.

A plurality of inlets and outlets (e.g., in the form of connecting ports and/or flanges) may be provided in the main body 1100 to facilitate flow of liquid, sand, and other debris through the separator 1000. An inlet (e.g., inlet port 1020 provided in the main body 1100) may allow flow into the interior chamber 1010 from a wellbore. The inlet port 1020 may be fluidly connected to the wellbore by rigid or flexible pipe, and flow to the inlet port 1020 may be regulated by one or more valves or the like (see FIG. 8). As shown in FIGS. 6-7, the inlet port 1020 may include a tube 1022 extending into the interior chamber 1010, with a terminal end of the tube 1022 being partially obstructed by a baffle 1024. Gas, liquid, sand and other debris entering the interior chamber 1010 flows through the tube 1022, in the direction of arrow A, and any solid and/or liquid contaminants carried by the gas may be deflected by the baffle 1024 toward a bottom of the interior chamber 1010. Such contaminants may include, for example, sand, water, oil, rock, and metal fragments.

An outlet (e.g., liquid, sand, and debris outlet port 1030) may be provided at or near a lower portion of the interior chamber 1010. The outlet port 1030 may be fluidly connected to a valve 2000 which may be periodically and/or continuously opened and closed to drain liquid and solid contaminants collected at the bottom of the interior chamber 1010. The valve 2000 may be mounted remotely from the separator 1000 by rigid or flexible pipe. The valve 2000 may feed into a waste holding tank 3000 (see FIG. 8), also via rigid or flexible pipe, for holding contaminants removed from the gas until the contaminants can be safely processed for disposal.

Figure 8:
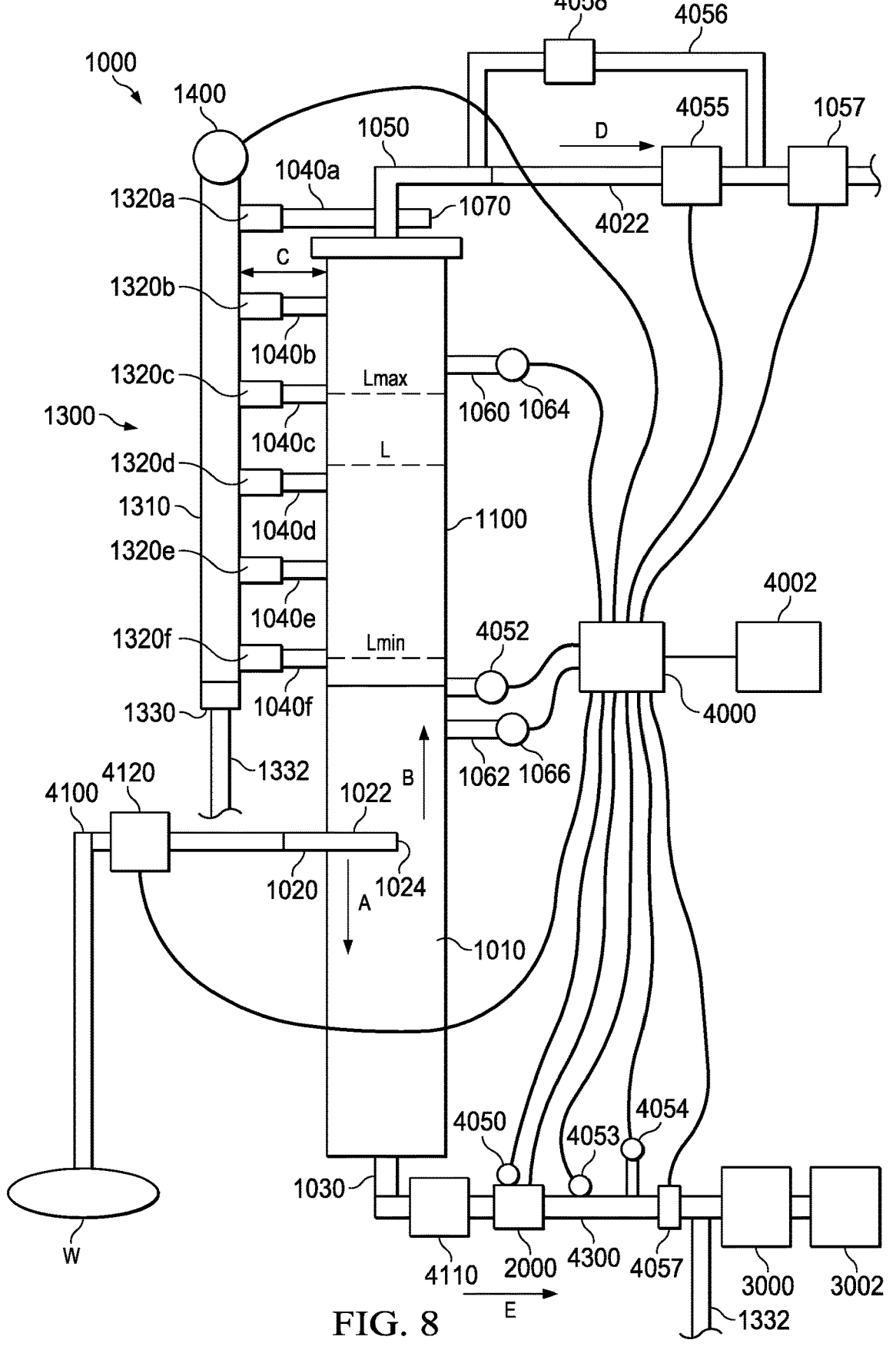
FIG. 8 is a fluid schematic of the separator of FIG. 2.

As shown in FIG. 8, the holding tank 3000 may be fluidly coupled to one or more pieces of downstream processing equipment 3002. The downstream processing equipment may include, for example, one or more separation components used to separate the different constituents of the liquid, sand, and/or debris output from the separator 1000. The downstream processing equipment 3002 may, in certain embodiments, comprise a dedicated sand vessel configured to remove sand from the waste fluid, a gun barrel-type separator, or a pressurized four-phase (e.g., gas, sand, water and oil) separation skid equipped with a sand removal device. Use of a pressurized four-phase separation skid may allow the well pressure to provide the motive force for removing fluid from the well pad, instead of diesel transfer pumps.

The valve 2000 may be a dump valve, and more particularly a hardened dump valve 2000. It should be noted, however, that any desired type of valve 2000 may be used to output liquid, sand, and/or debris from the lower portion of the interior chamber 1010. The valve 2000 may be a piston valve, a ball valve, a butterfly valve, a gate valve, a choke valve, a needle valve or the like suitable for operation at pressures up to, for example, 5,000 psi. The valve 2000 may include an electrical, hydraulic, or pneumatic actuator such as an electric motor, solenoid, hydraulic actuator, pneumatic actuator, or combinations thereof such that opening and closing of the valve 2000 can be performed automatically by an electronic controller 4000 (see FIG. 8). As such, the valve 2000 may be an electronically controlled valve. In certain embodiments, the valve 2000 may include a fast-acting electrically actuated linear valve actuator used to rapidly transition the valve 2000 between open and closed positions and/or to one or more intermediate positions between the open and closed positions. The valve actuator may be capable of transitioning the valve 2000 between a fully open position and a fully closed position in less than 2.0 seconds, more particularly less than 1.0 second, or more particularly less than 0.5 seconds.

In some embodiments, the valve 2000 may be configured to be selectively operated in a hand mode. In some embodiments, the controller that controls the valve 2000 may be programmed to allow operation of the valve 2000 in a hand mode. "Hand mode" is a manual operation mode by which the valve 2000 may be selectively opened or closed manually either by rotating the wheel handle or by the user pressing buttons on the valve to open and close it. This may allow for equalization across the valve 2000 to drain the line segment for maintenance of the valve. In some embodiments, the valve 2000 may be equipped with a bleed valve for performing maintenance on the valve 2000.

In some embodiments, the valve 2000 may be equipped with or coupled to a pressure pilot device configured to automatically initiate closure of the valve 2000 upon encountering pressure in the valve line above a predetermined threshold. This may prevent high pressure from damaging the holding tank 3000 and/or other downstream components 3002, for example, in the case of gas breaking through the liquid, sand, and debris outlet 1030 of the separator 1000. The pressure pilot device associated with the valve 2000 may thus provide a failsafe for the separator system. In other embodiments, a pressure transducer 4053 may be disposed in the valve line downstream of the valve 2000 and configured to detect pressure in the line and communicate the detected pressure to the controller 4000, as shown in FIG. 8. The controller 4000 may then send an electronic command to close the valve 2000 to prevent high pressure from damaging downstream components. Both an active pilot safety valve and/or pressure transducer may be used. Because of the critical nature of this operation, redundant pilot safety valves and/or pressure transmitters may be used.

As illustrated in FIG. 8, in some embodiments a valve position sensor 4050 may be disposed proximate or incorporated into the valve 2000. The valve position sensor 4050 may include at least one of a visual detection sensor, a motion sensor, a pressure sensor, a strain gauge, or any other type of sensor configured to indicate either a relative position of the valve 2000, or simply whether the valve 2000 is fully closed. The valve position sensor 4050 may indicate an operational position of the valve 2000. The valve position sensor 4050 may be connected to the controller 4000 to provide feedback of the operational position of the electronically controlled valve 2000 to the controller 4000. This valve position feedback may be used by the controller 4000 to identify the presence of an obstruction to the valve 2000 (e.g., in the event that the valve 2000 fails to completely close). Upon identifying an obstruction to the valve 2000, the controller 4000 may output a notification to a user interface 4002 coupled to the controller 4000 so that a user may manually remove the obstruction or switch operation of the valve 2000 to a backup valve. In other embodiments, the controller 4000 may output a command to a piece of equipment designed to automatically remove obstructions from the valve 2000. The obstruction can be cleared by initiating a rapid open/close cycle. In at least one embodiment, the feedback to the controller 4000 can be used to detect wash out (erosion) where the valve is closed but fluid is still leaking past the valve. A second valve or emergency shutdown ("ESD") valve 4057 may be located downstream of valve 2000.

Figure 9:
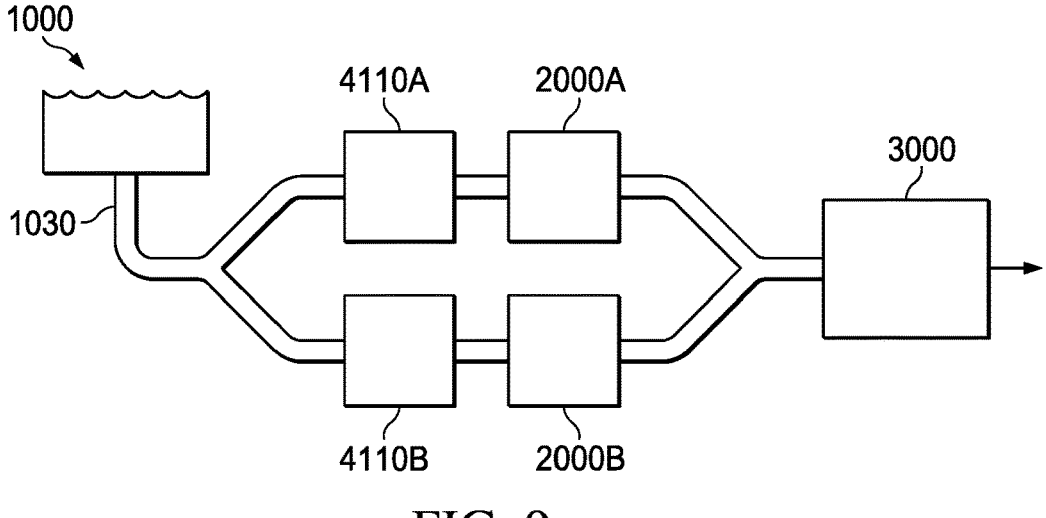
FIG. 9 is a fluid schematic of a dual dump valve arrangement for use with the separator of FIG. 2.

In some embodiments, two or more valves 2000 may be provided in parallel to one another due to the critical nature of this component. If one of the two valves 2000 fails, leaks, erodes or is nonoperational (e.g. undergoing maintenance), the second valve 2000 may be used to operate the separator 1000. FIG. 9 schematically illustrates the arrangement of two valves 2000A and 2000B in parallel. The primary valve 2000A and secondary valve 2000B may be identical valves, so that fewer maintenance components and spare parts are needed to perform maintenance and repairs on the valves 2000. As illustrated, the valves 2000A and 2000B may be coupled to independent strainers (or junk catchers) 4110A and 4110B, respectively, provided upstream of the valves 2000A and 2000B to capture debris. The valves 2000A and 2000B may feed into the same waste holding tank 3000, as illustrated, or into different waste holding tanks. Both valves 2000A and 2000B may be electronically controlled and connected to the controller 4000. The valves 2000A and 2000B may be electronically controlled by the controller 4000 to provide a fixed flow rate, e.g., 150 barrels of water per hour rather than controlled to maintain a certain level of liquid in the interior chamber 1010 of the vessel. As those of ordinary skill in the art will appreciate, this method of operation may be employed, e.g., where little to no gas is present.

Turning back to FIGS. 2-8, in some embodiments, a plurality of bridle ports 1040a-1040d may be provided in the upper vessel section 1100 and may be configured to connect to a bridle 1300. The bridle 1300 may include a tube 1310 and a plurality of connecting flanges 1320a-1320d. As illustrated, the tube 1310 may be a vertical tube 1310 (i.e., the tube axis is oriented vertically). Each of the connecting flanges 1320a-1320f may connect to a corresponding one of the bridle ports 1040a-1040f, such that fluid can flow freely between the tube 1310 and any of the bridle ports 1040a-1040f via the connecting flanges 1320a-1320f. Because fluid can flow freely between the interior chamber 1010 and the bridle 1300 via the bridle ports 1040a-1040f, a liquid level in the tube 1310 of the bridle 1300 self-equalizes with a liquid level in the interior chamber 1010. As such, the liquid level in the interior chamber 1010 may be ascertained by measuring the liquid level in the bridle 1300. The bridle 1300 also helps to protect the instruments from gas bubbles in the interior chamber 1010, which can cause the instruments to record inaccurate readings.

As shown in the accompanying drawings, a representative embodiment of the separator 1000 includes six bridle ports 1040a-1040f and six corresponding connecting flanges 1320a-1320f. As those of ordinary skill in the art will appreciate, the bridle 1300 may include more than six bridle ports or a lesser number. The bridle port third from the top 1040c may correspond to a high liquid level within the interior chamber 1010, and the lowermost bridle port 1040f may correspond to a low liquid level within the interior chamber 1010. During operation, the valve 2000 may be periodically and/or continuously opened and closed, or modulated between an opened and closed position, to maintain the liquid level within the interior chamber 1010 at a desired level, for example between the bridle port third from the top 1040c and the lowermost bridle port 1040f. The two intermediate bridle ports 1040d, 1040e between the bridle port third from the top 1040c and the lowermost bridle port 1040f may facilitate equalization of the liquid level in the interior chamber 1010 with the liquid level in the bridle 1300. The bridle port 1040a prevents the formation of a gas pocket from forming at the top of the bridle 1300 and allowing the liquid level sensor 1400 to take measurements along the entire length of the bridle 1300 and vessel. The bridle ports 1040a-f may be spaced vertically apart from one another and be of sufficient cross-sectional area to ensure that the liquid level within the bridle 1300 can rapidly equalize with the liquid level in the interior chamber 1010. That is, the bridle ports 1040a-f allow sufficient liquid flow into the bridle 1300 to minimize time delay in equalization of the liquid level within the bridle 1300 to the liquid level in the interior chamber 1010. It is to be understood that the separator 1000 may include more or fewer bridle ports, and a corresponding number of connecting flanges, than are shown in the drawings in order to reduce liquid level equalization time in the bridle 1300. Moreover, the bridle ports may have increased cross sectional area in order to reduce liquid level equalization time in the bridle 1300. The bridle 1300 may include a cleanout valve 1330 that may be used to evacuate sand or other particulate material that may become trapped in the bridle 1300. The cleanout valve 1330 may be coupled to a drain line 1332 extending from the bridle 1300. In FIGS. 2-4, 6, and 6A, the drain line 1332 is illustrated as leading back into the interior chamber 1010 of the separator. In other embodiments (e.g., as shown in FIG.

8), the drain line 1332 may be a flow path extending from the bridle 1300 to a location downstream of the valve 2000 for outputting the sand or other particulate material to the waste holding tank 3000 or another downstream location.

Figure 10:
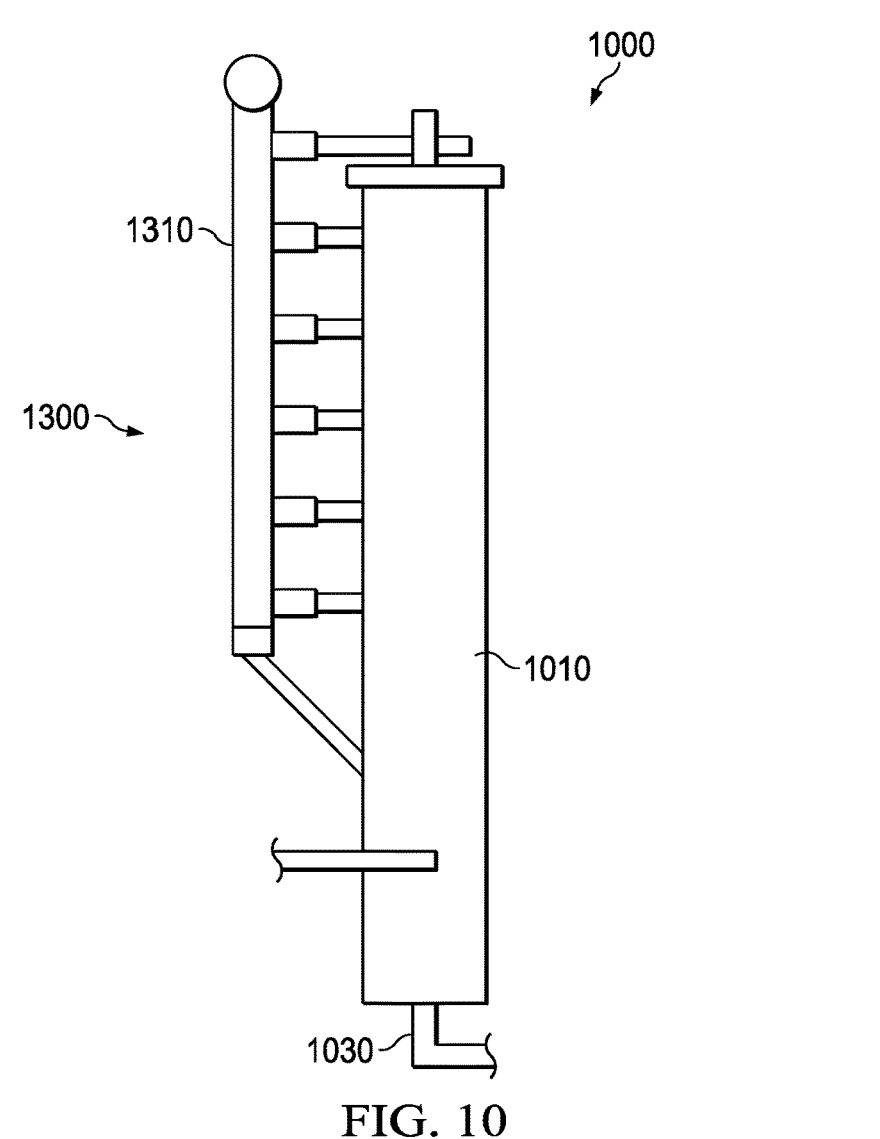
FIG. 10 is a schematic partial cross-sectional view of a separator according to another embodiment of the present disclosure.

In some embodiments, the drain line 1332 of the bridle 1300 may be at least partially tilted with respect to a vertical direction, as shown in FIG. 10. In at least one example the drain line 1332 is installed at a 45° angle from the vertical axis of the bridle 1300. As shown in FIGS. 8 and 10, the lower drain line 1332 may be tilted back into the interior chamber 1010 of the separator 1000. The tilted drain line 1332 of the bridle 1300 may prevent buildup of sand or other particulate material in the bridle 1300, since the tilted axis of the drain line 1332 and its intersection with the interior chamber 1010 automatically urges any sand or particulate material to settle back into the bottom of the interior chamber 1010 for eventual release through the outlet 1030.

In some embodiments, the bridle may be equipped with cleanout out ports or plugs, 1340a-1340f, as shown in FIG. 6. These ports allow for the cleaning of the equalization ports/piping, in the event sand or debris collects in the horizontal pipe segments associated with equalization ports 1320a-f.

A liquid level sensor 1400 may be inserted in the tube 1310 of the bridle 1300 to determine the liquid level in the tube 1310 which, as noted above, is automatically equalized with the liquid level in the interior chamber 1010, by flow through the bridle ports 1040c, 1040d, 1040e, 1040f. The liquid level sensor 1400 may be in electronic communication with the controller 4000 that actuates the valve 2000. In particular, the controller 4000 may open and close the valve 2000, and in particular modulate between open and closed states, based on the measured liquid level in the bridle 1300. In an embodiment, the liquid level sensor 1400 may be a guided wave radar sensor including a probe that extends generally parallel to an axis of the tube 1310 so as to be immersed in any liquid within the bridle 1300. Examples of suitable, commercially available guided wave radar sensors include the Eclipse® Model 706 by Orion® Instruments. In other embodiments, the liquid level sensor 1400 may be a capillary tube, a differential pressure sensor, an ultrasonic sensor, or the like. However, guided wave radar may be desired as that technology can determine differences as fine as 0.10 inches of water column in real-time and is effective throughout the life of the well down to, for example, 2 psi. In comparison to a differential pressure sensor, the guided wave radar may be desired because it is unaffected by the ever-changing gravity of the fluid. In some embodiments, the liquid level sensor 1400 may be configured to determine a stratification level between water and oil in the bridle 1300.

Figures 11, 12:
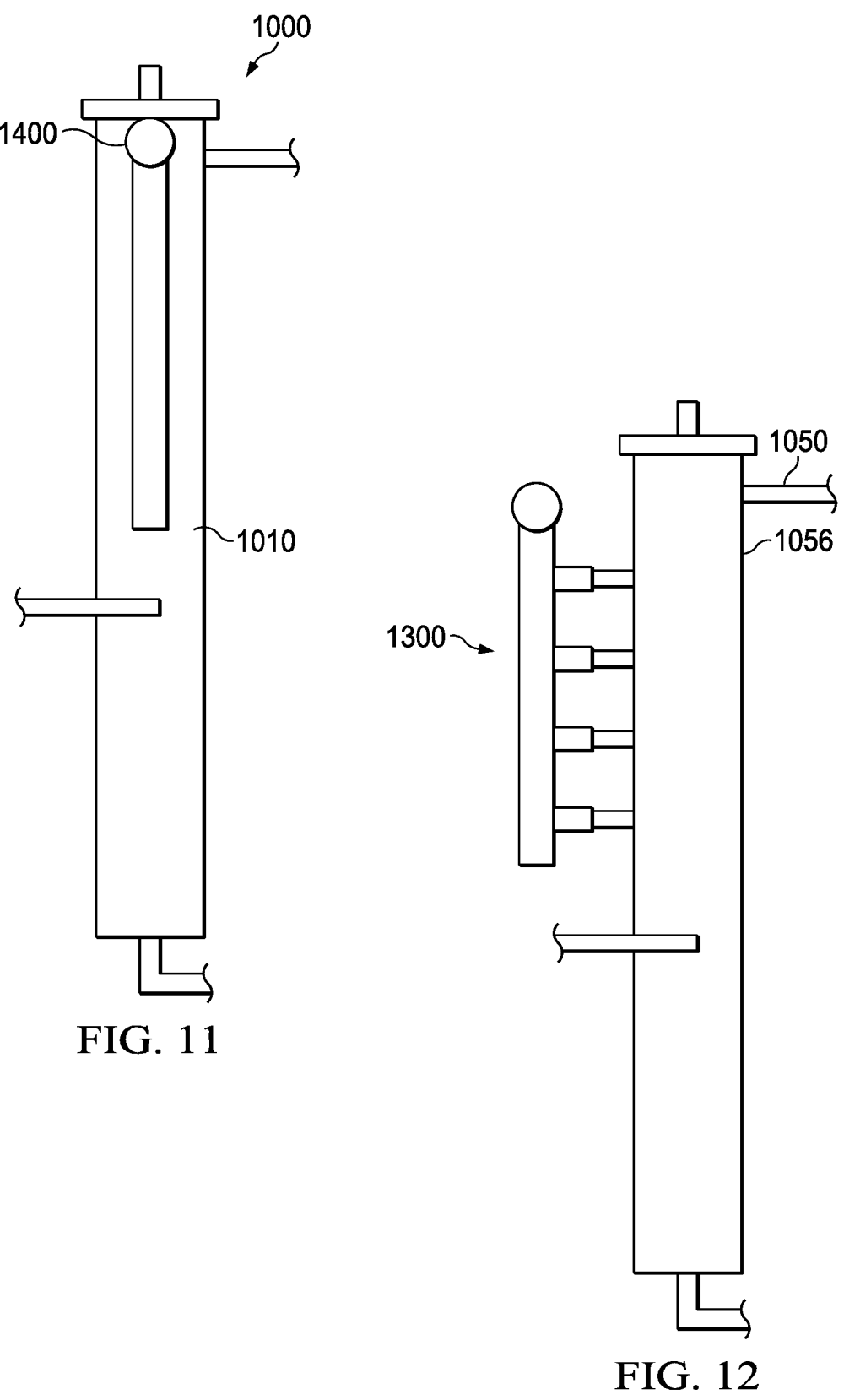
FIG. 11 is a schematic partial cross-sectional view of a separator according to another embodiment of the present disclosure.
FIG. 12 is a schematic partial cross-sectional view of a separator according to another embodiment of the present disclosure.

In some embodiments, the separator 1000 may not include a bridle at all. For example, as shown in FIG. 11, the separator 1000 may include a liquid level sensor 1400 inserted directly into an upper portion of the interior chamber 1010 of the separator 1000 to determine the liquid level in the separator 1000. The liquid level sensor 1400 may be a guided wave radar sensor, as described above. In still other embodiments, the separator 1000 may include both a bridle 1300 with a first liquid level sensor 1400 disposed therein (as shown in FIG. 8) and a second liquid level sensor 1400 disposed in the interior chamber 1010 (as shown in FIG. 11) to provide redundant measurements of the liquid level in the separator 1000.

With continued reference to FIGS. 2-7, a gas outlet (e.g., gas outlet port 1050) may be provided in the main body 1100 through which gas may flow out of the separator 1000 to downstream components of the facility, such as a line heater or molecular dryer. The gas outlet port 1050 may be fluidly connected to the downstream components, for example, by rigid or flexible pipe. The gas outlet port 1050 may be located vertically above the uppermost bridle port 1040a, and therefore above the intended liquid level of the interior chamber 1010, such that no liquid flows out of the gas outlet port 1050 during normal operation. In some embodiments, a mist extractor 1052 may be provided within the interior chamber 1010 below the outlet port 1050 to prevent very fine water droplets/aerosols from reaching the outlet port 1050 and exiting the separator 1000. In some embodiments, a diffuser 1054 (see FIG. 6) may be provided within the interior chamber 1010 to allow gas to more easily travel upward within the interior chamber 1010.

In some embodiments, the gas outlet port 1050 may extend through a top of the main body 1100 of the separator 1000, as shown in FIGS. 2-7, thereby enabling a maximum length of the bridle 1300 and/or a maximum length between the upper and lower limits for the liquid level in the separator 1000. In other embodiments, as shown in FIG. 12, the gas outlet port 1050 may extend through a side wall 1056 of the main body 1100 of the separator 1000.

In some embodiments, a gas measurement device 1057, as shown in FIG. 8 may be installed to measure gas volumes exiting separator 1000. The measurement device may be an ultrasonic, orifice, VCone, or any device capable of measuring gas volumes exiting the separator 1000. By measuring the gas flow immediately downstream of separator 1000, gas from other wells that have been measured can be comingled. This is of particular importance where each of the wells are on different gas leases or have different gas ownership. This also allows multiple wells to be tied together to collectively harness their energy through common downstream equipment.

An upper sensor port 1060 may be provided in the main body 1100 of the separator 1000 and may receive an upper limit sensor 1064, such as a limit switch, float switch, thermal dispersion switch, or the like. The upper sensor port 1060 may be located vertically above the uppermost bridle port 1040a and vertically below the gas outlet port 1050. In some embodiments, the upper limit sensor 1064 may be located above an uppermost point at which the liquid level sensor 1400 can detect liquid. The upper limit sensor 1064 may be used to detect the presence of liquid, and may thus serve as an auxiliary device, in addition to the liquid level sensor 1400, for determining if the liquid level is above a predetermined high point in the interior chamber 1010. The upper limit sensor 1064 may be in electronic communication with the controller 4000, and the controller 4000 may be programmed or configured to initiate a shutdown procedure if liquid is detected by the upper limit sensor 1064.

Similarly, a lower sensor port 1064 may be provided in the main body 1100 of the separator 1000 and may receive a lower limit sensor 1066, such as a limit switch, float switch, thermal dispersion switch, or the like. The lower sensor port 1062 may be located vertically below the lowermost bridle port 1040f and vertically above the inlet port 1020. In some embodiments, the lower limit sensor 1066 may be located below a lowermost point at which the liquid level sensor 1400 can detect liquid. The lower limit sensor 1066 may be used to detect the presence of liquid, and may thus serve as an auxiliary device, in addition to the liquid level sensor 1400, for determining if the liquid level is below a predetermined low point in the interior chamber 1010. The lower limit sensor 1066 may be in electronic communication with the controller 4000, and the controller 4000 may be programmed or configured to initiate a shutdown procedure if liquid is not detected by the lower limit sensor 1066.

Figure 16:
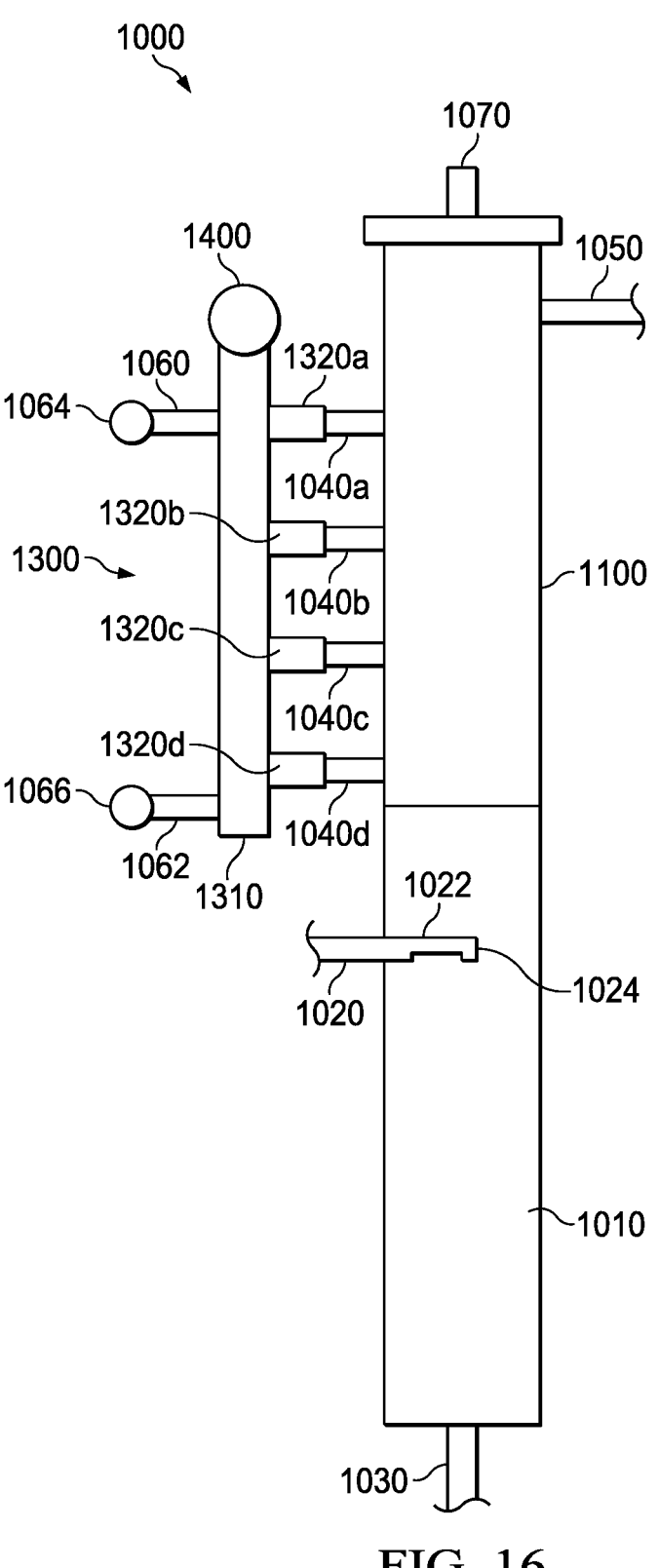
FIG. 16 is a side cross-sectional view of the separator according to another embodiment of the present disclosure.

In the embodiments shown in FIGS. 2-6 and 8, the upper sensor port 1060 and the lower sensor port 1064 are provided in the main body 1100 of the separator 1000. FIG. 16 shows an alternative embodiment in which the upper sensor port 1060 and the lower sensor port 1064 are provided in the bridle 1300. The functionality of the upper sensor port 1060 and the lower sensor port 1064, along with the associated upper and lower limit sensors 1064, 1066, are the same in the embodiment shown in FIGS. 2-6 and 8 and the embodiment shown in FIG. 16.

With reference to FIG. 8, a density sensor port may be provided in the main body 1100 of the separator 1000 and may receive a density sensor 4052, such as a Coriolis meter or the like. The density sensor port may be located vertically above the lower sensor port 1064 and vertically below the lowermost bridle port 1040f The density sensor 4052 may be used to detect the density or specific gravity of the fluid (liquid) in the main body 1100 of the separator 1000. The density sensor 4052 may be in electronic communication with the controller 4000, and the controller 4000 may be programmed or configured to open, close, or modulate the shutoff valve 4120 depending on the detected flow rate and/or sand concentration of the liquid, sand, and debris in the separator 1000.

A second density sensor 4054 may be ported to the valve line upstream of the valve 2000, as illustrated in FIG. 8. The second density sensor 4054 may comprise the same type of sensor (e.g., a Coriolis meter) as the density sensor 4052 in the separator 1000. The second density sensor 4054 may be used to detect the flow rate and/or density or specific gravity of the fluid (liquid) from the separator 1000. The density sensor 4054 may be in electronic communication with the controller 4000, and the controller 4000 may be programmed or configured to open, close, or modulate the shutoff valve 4120 depending on the flow rate and/or density or specific gravity of the fluid (liquid) in the separator 1000 (detected by sensor 4052) in comparison to the flow rate and/or sand concentration of the liquid, sand, and debris output from the separator 1000. By comparing the density measured by density sensor 4052 to the density measured by density sensor 4054 an accurate estimation of sand concentration can be ascertained thereby helping to understand in real time the density of fluid flowing through the separator 1000. The determined density and flow rates of fluid flowing through the separator 1000 may be used to provide volume control of production out of the well. It can also serve as a safety device shutting in the system if gas is present.

Referring again to FIGS. 2-6, a relief valve 1070 may be provided at or near the top of the upper vessel section 1100 and may be configured to open at a predetermined pressure to allow pressurized gases to escape from the interior chamber 1010. The pressure at which the relief valve 1070 is configured to open may be selected to prevent damage to the separator 1000 and/or downstream components from excess gas pressure. For example, the relief valve 1070 may be configured to open if the gas pressure in the interior chamber 1070 exceeds the maximum operating temperature of the separator 1000, for example approximately 5,000 psi. The relief valve 1070 may be passive, e.g. having a spring that deflects at a predetermined crack pressure, or may be actively controlled by the controller 4000.

With continued reference to FIGS. 2-6, the relative vertical locations of the various ports may optimize performance of the separator 1000. For example, the inlet port 1020 may be located below the bridle ports 1040a-1040f, with the baffle 1024 directing inflow downward, so that contaminants do not flow toward and become trapped in the bridle 1300. The inlet port 1020 may also be located below the gas outlet port 1050 so that less dense gas rises above relatively more dense water, such that only the gas exits the separator 1000 via the gas outlet port 1050. Moreover, the gas outlet port 1050 may be located at the top of the main body 1100, and therefore above the intended liquid level within the separator 1000, again to prevent water from exiting through the gas outlet port 1050. The liquid, sand, and debris outlet port 1030 may be positioned as near to the base of the separator 1000 as is reasonably practical so that liquid and contaminants cannot collect below the liquid, sand, and debris outlet port 1030. The upper sensor port 1060 may be located above the uppermost bridle port 1040a and the lower sensor port 1062 may be provided below the lowermost bridle port 1040f, such that the upper and lower limit sensors 1064, 1066 may serve as failsafes in the event that the liquid level sensor 1400 fails to detect and account for the liquid level being outside the intended range.

It should be noted that an increased vertical length of the bridle 1300 may provide additional reaction time for the valve 2000 to release the liquid, sand, and debris from the main body 1010 of the separator 1000. In some embodiments, the length of the bridle 1300 and the probe length of the liquid level sensor 1400 may be selected such that the liquid level sensor 1400 has a probe length of approximately 80 inches and a targeted liquid level (e.g., a midpoint length of the bridle 1300) of approximately 55 inches.

A user interface 4002 may be communicatively coupled to the controller 4000 for outputting real time or near-real time data from the controller 4000 to a user. The user interface 4002 may take the form of a general computer, a handheld device, a siren, a light bar placed atop the separator, or any other component designed to output information to a user. The user interface 4002 may output alerts when the liquid level is outside of a desired range, a malfunction or obstruction in the valve 2000 is detected, a detected sand density of the fluid flow indicates that the volume of well production should be adjusted, or regular maintenance is needed.

In some embodiments, as shown in FIG. 8, an electronically controlled valve 4055 may be present on a gas line 4022 downstream of the gas outlet 1050 of the separator 1000. The valve 4055 on the gas line 4022 may include any desired type of valve such as, for example, a choke. The valve 4055 may be communicatively coupled to the controller 4000, which controls operation of the valve 4055 to control flow of gas through the separator 1000. The controller 4000 may communicate with one or both of the valve 4055 and the valve 2000 to control flow of fluid through the separator 1000 to maintain the desired liquid level in the separator 1000.

In some embodiments, a bypass line 4056 may be fluidly coupled to the gas outlet 1050 to bypass the electronically controlled valve 4055 on the gas line 4022. A bypass valve 4058 is disposed along the bypass line 4056, and the valve 4058 may be selectively opened to allow gas to flow around the electronically controlled valve 4055. The bypass line 4056 and the bypass valve 4058 may be smaller than the gas line 4022 and the electronically controlled valve 4055, respectively, to handle the smaller volumetric flow rates of gas exiting the separator during the initial phases of flowback operations where very little gas is present. The bypass valve 4058 may be manually operated or electronically activated. The bypass line 4056 and valve 4058 may be used to "burp" the separator 1000 during initial phases of flowback operations, for example, when extremely large volumes of liquid, sand, and debris are flowing through the separator 1000 without much gas. To maintain the liquid level in the separator 1000 in a desired range during initial phases of flowback, the electronically controlled valve 4055 on the gas line 4022 may be closed. A gas pocket eventually forms at an upper portion of the interior chamber 1100 of the separator 1000, at which point the separator 1000 would need to be "burped" to remove the gas pocket and restore the liquid level. The bypass valve 4058 may be opened and then closed again, thereby removing the gas pocket. The process may be repeated at regular intervals throughout flowback operations, these intervals getting shorter and shorter until there is a steady stream of gas flowing through the separator 1000. Once a steady stream of gas is flowing through the separator 1000, the bypass line 4056 may be closed and the electronically controlled valve 4055 operated after the initial flowback operations.

Figure 7A:
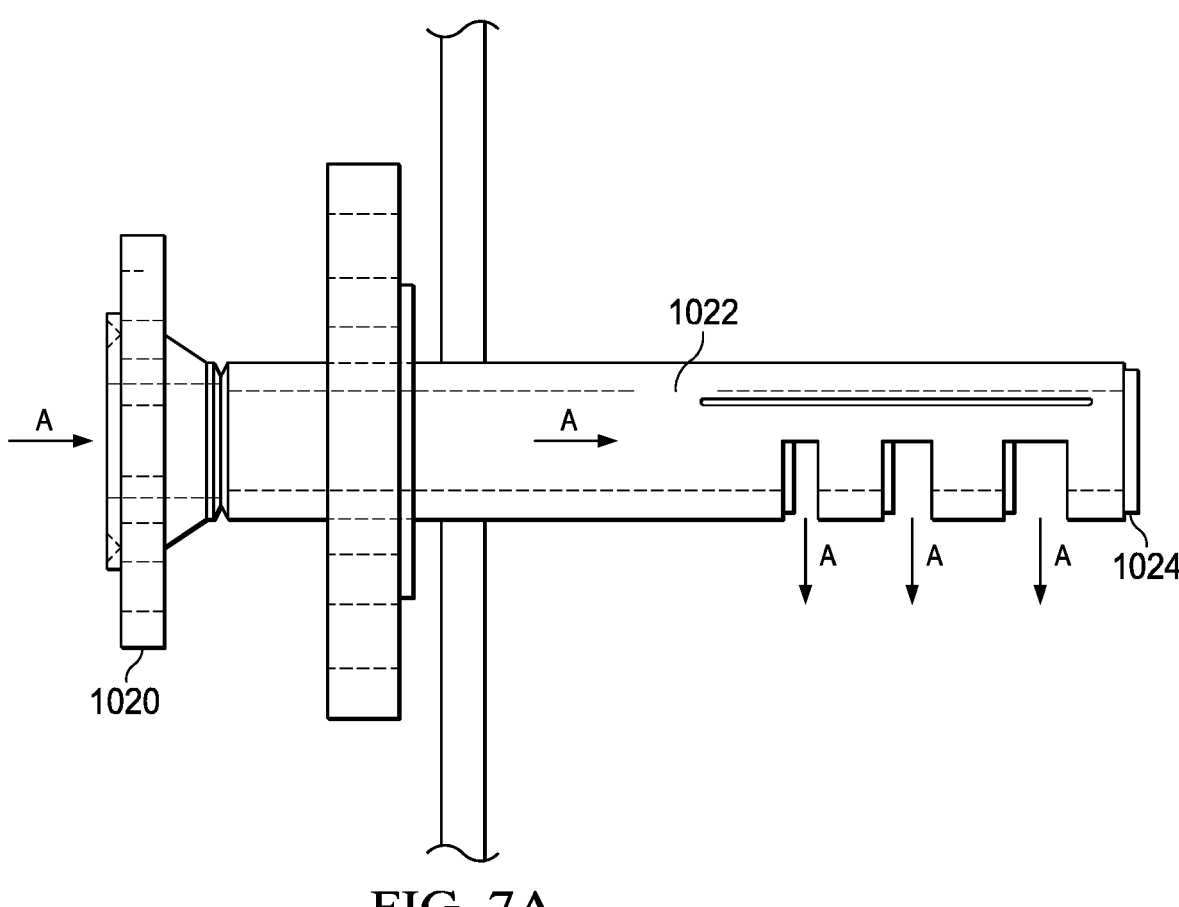
FIG. 7A is a detail view of an alternate embodiment of an inlet port of the separator of FIG. 2.

Having generally described the components of the separator 1000, detailed operation of the separator 1000 will now be described with reference to FIG. 8. Gas initially enters the separator 1000 from the wellbore W via the inlet port 1020. The inlet port 1020 may be fluidly connected to the wellbore W by piping 4100. The gas entering the separator 1000 may carry with it various contaminants, including water (in both liquid and vapor form) and sand from hydraulic fracturing (i.e. "fracking"). Additionally, the gas may carry debris, such as fragments (e.g., plug pieces) from plugs used during the fracturing process. Once inside the separator 1000, all media including gas, liquid, sand, and debris may flow through the pipe 1022 and be deflected downward by the baffle 1024, in the direction of arrow A. In an alternate embodiment, the pipe 1022 may have multiple openings, as shown in FIG. 7A.

Solid contaminants, such as sand and debris, settle in the bottom of the interior chamber 1010. Liquid, such as water, fills the interior chamber 1010 from the bottom up, establishing a liquid level L. Gas, being less dense than the liquid flows toward the top of the interior chamber 1010 in the direction of arrow B, rises above the liquid to fill the top of the interior chamber 1010. A diffuser (e.g., 1054 of FIG. 6) in the separator 1000 may assist the upward movement of gas through the interior chamber 1010. Once the liquid level L reaches the lowermost bridle port 1040*f*, the gas and liquid may flow freely between the interior chamber 1010 and the bridle 1300 in the direction of arrows C via the bridle ports 1040*a*-1040*f*. The liquid level L thus equalizes between the interior chamber 1010 and the bridle 1300.

The gas flows out of the separator 1000 via the gas outlet port 1050 in the direction of arrow D to piping 4022. The piping 4022 may in turn be fluidly connected to downstream components (e.g. a line heater or molecular dryer).

As the liquid level L rises from continued inflow from the wellbore, the valve 2000 may be opened to allow liquid, sand, and debris to flow out of the separator 1000 in the direction of arrow E via the outlet port 1030. In particular, the liquid, sand, and debris may flow through piping 4300 to the holding tank 3000, as shown in FIG. 8. To prevent large debris, such as plug fragments, from clogging or damaging the valve 2000, a strainer 4110 may be provided upstream of the valve 2000 to capture such debris.

The valve 2000 may be opened and closed by the controller 4000 based on the liquid level L as measured by the liquid level sensor 1400. The controller 4000 may receive a signal from the liquid level sensor 1400 indicating the vertical position of the liquid level L. If the liquid level L is at or above a maximum safe liquid level $L_{max}$, the controller 4000 may transmit a signal to the valve 2000 to open the valve 2000. With the valve 2000 open, liquid, sand, and debris in the interior chamber 1010 may flow out of the outlet port 1030 in the direction of arrow E, thereby lowering the liquid level L.

The valve 2000 may remain open until the liquid level L has reached a minimum safe liquid level $L_{min}$. When the liquid level sensor 1400 detects that the liquid level L has reached the minimum safe liquid level $L_{min}$ the liquid level sensor 1400 may transmit a signal to the controller 4000 which in turn may transmit a signal to the valve 2000 to close the valve 2000. With the valve 2000 closed, the liquid level L may again rise to the maximum safe liquid level $L_{max}$, at which time the controller 4000 may again open the valve 2000 based on the determination from the liquid level sensor 1400. The valve 2000 may be repeatedly opened and closed in this manner to maintain the liquid level L between the maximum safe liquid level $L_{max}$ and the minimum safe liquid level $L_{min}$ as gas is extracted from the wellbore. In some embodiments, the valve 4055 on the gas line 4022 may be similarly opened and closed to maintain the liquid level L between the maximum safe liquid level $L_{max}$ and the minimum safe liquid level $L_{min}$ as gas is extracted from the wellbore. By maintaining the liquid level L in this manner, liquid water is prohibited from flowing out of the gas outlet port 1050 and gas is prevented from flowing out of the outlet port 1030.

As shown in FIG. 8, the maximum safe liquid level $L_{max}$ may correspond to the position of the uppermost bridle port 1040*a*, and the minimum safe liquid level $L_{min}$ may correspond to the position of the lowermost bridle port 1040*d*. However, it is to be understood that the maximum safe liquid level $L_{max}$ and the minimum safe liquid level $L_{min}$ need not correspond to the positions of the bridle port third form the top 1040*c* and the lowermost bridle port 1040*f*, but could rather correspond to any locations at which liquid may be present in the bridle 1300.

With continued reference to FIG. 8, the piping 4100 leading from the wellbore to the separator 1000 may include a shutoff valve 4120, which may be manually or automatically closed to halt flow into the separator 1000. In some embodiments, the shutoff valve 4120 may be controlled by the controller 4000 in response to measurements taken by the liquid level sensor 1400, the upper and lower limit sensors 1062, 1066, the density sensors 4052, 4054, or a combination of all of the sensors. The controller 4000 may receive signals from the limit sensors 1064, 1066, and based on those signals, transmit a signal to actuate the shutoff valve 4120. If, based on a signal received from the upper limit sensor 1064, the controller 4000 determines that the liquid level within the interior chamber 1010 is above a predetermined maximum, the controller 4000 may transmit a signal to close the shutoff valve 4120. By closing the shutoff valve 4120, flow into and out of the separator 1000 is halted, thereby preventing liquid from advancing downstream.

Similarly, the controller 4000 may transmit a signal to close the shutoff valve 4120 if the controller 4000 determines that the liquid level within the interior chamber 1010 is below a predetermined minimum, based on a signal received from the lower limit sensor 1066. By closing the shutoff valve 4120, flow into and out of the separator 1000 is halted, thereby preventing the separator 1000 from running dry and the pressure from getting too high in the holding tank 3000.

The controller 4000 may also transmit a signal to open, close, or modulate the shutoff valve 4120 to control the flow of fluid into the separator 1000 from the well based on a determination of the sand concentration of the fluid flowing through the separator 1000. As discussed above, the controller 4000 may determine the real time concentration of sand flowing through the separator 1000 based on measurements taken via the density sensors 4052, 4054. The controller 4000 could also be programmed to close the valve 4120 if fluid flow is detected through valve 2000 by sensor 4054 when valve 2000 is in the closed position.

In some embodiments, the controller 4000 may utilize proportional-integral-derivative (PID) logic to continuously and/or repeatedly receive measurement signals from the liquid level sensor 1400, and subsequently actuate the valve 2000 and/or the valve 4055 to maintain the desired liquid level L in the manner described herein. Similarly, the controller 4000 may utilize proportional-integral-derivative (PID) logic to continuously and/or repeatedly receive measurement signals from the upper and lower limit sensors 1064, 1066 and/or the density sensors 4052, 4054 and subsequently actuate the shutoff valve 4120 in response to fluid level in the interior chamber 1010 and/or the concentration of sand flowing through the separator 1000.

As described herein, the controller 4000 may be in communication with the liquid level sensor 1400, the valve 2000, the valve 4055, the upper and lower limit sensors 1064, 1066, the density sensors 4052, 4054, the shutoff valve 4120, and the valve position sensor 4050. The controller 4000 may include at least one processor programmed or configured to execute instructions stored on computer-readable media. The controller 400 may communicate with the liquid level sensor 1400, the valve 2000, the valve 4055, the upper and lower limit sensors 1064, 1066, the density sensors 4052, 4054, the shutoff valve 4120, and the valve position sensor 4050 by any suitable wired or wireless communication protocols and interfaces such as 4-20 milliamp HART signal, Ethernet, fiber optics, coaxial, infrared, radio frequency (RF), a universal serial bus (USB), Wi-Fi®, cellular network, and/or the like. The controller 4000 may be in communication with a user interface 4002 to provide real-time feedback to the electronic controller and/or to an operator of the liquid level L within the interior chamber 1010, and/or real-time feedback that the separator 1000 and its associated components are operating properly.

Figure 13:
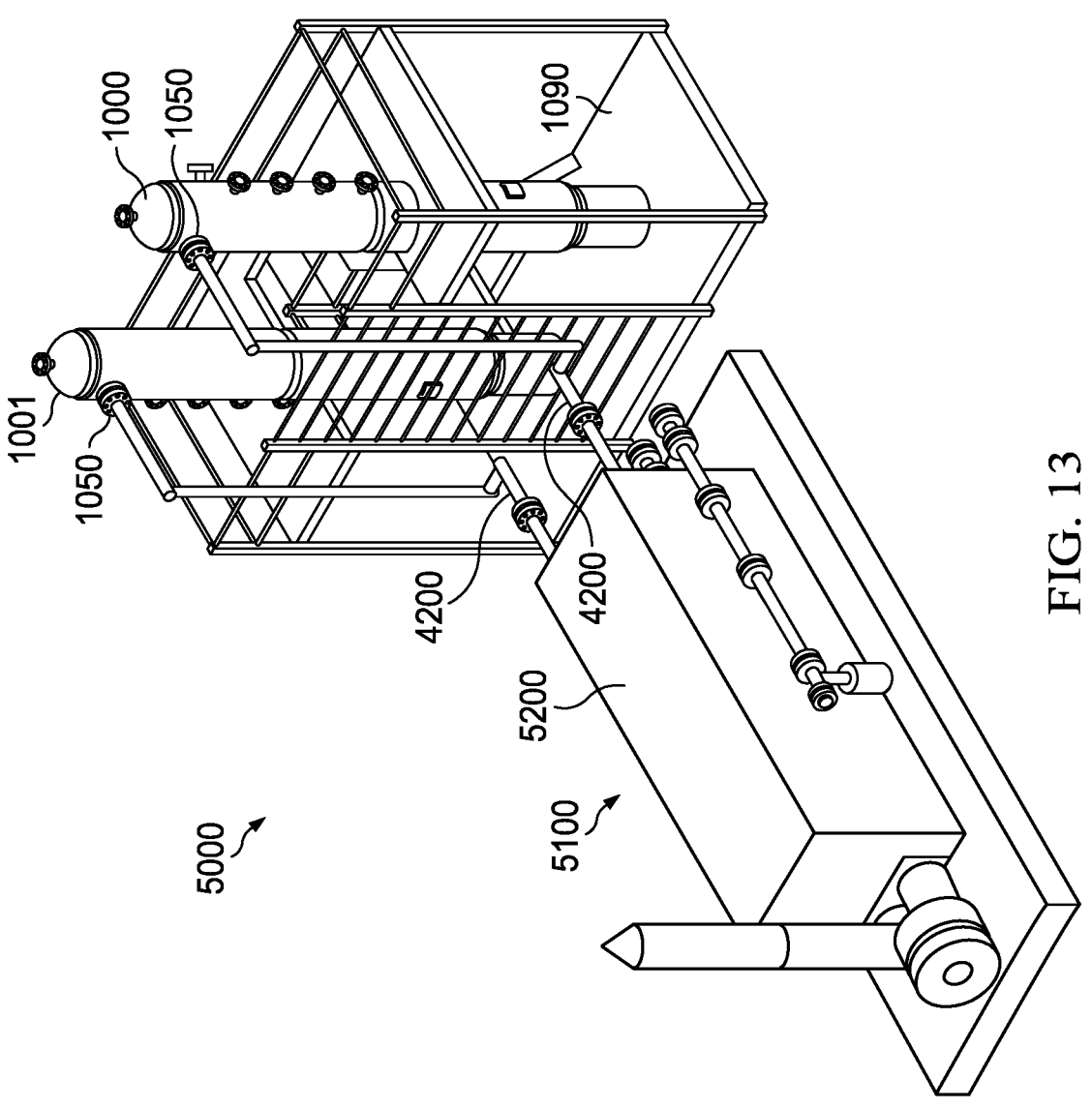
FIG. 13 is a perspective view of a gas processing facility according to an embodiment of the present disclosure.
Figure 14:
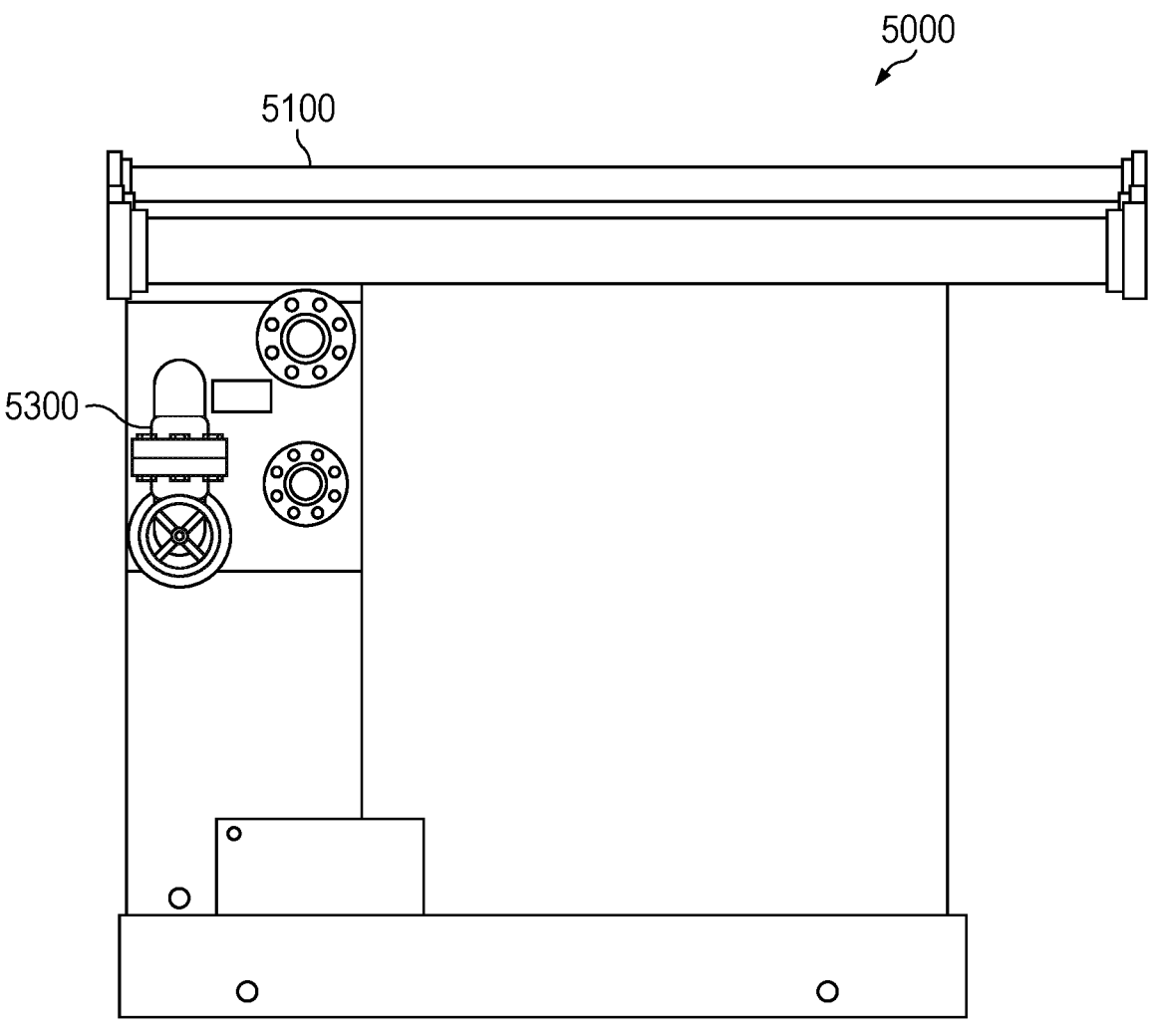
FIG. 14 is a rear view of the line heater and choke of FIG. 13.

Referring now to FIGS. 13 and 14, the separator 1000 may be used as a component of a gas processing facility 5000 including the separator 1000 and a line heater and choke assembly 5100. FIG. 13 shows two separators 1000 feeding into a single line heater and choke assembly 5100, although a single separator 1000 may also be used. The two separators 1000 may be used to produce gas from two different wells simultaneously. As illustrated, the two separators 1000 may be positioned side by side and connected to the same skid 1090 of downstream equipment (e.g., a single line heater and choke assembly 5100 for both separators 1000), thereby saving space. The line heater and choke assembly 5100 includes a line heater 5200 and a choke 5300. Gas, water, and contaminants flow in the separator 1000 from the wellbore W, where the water and contaminants are separated from the gas as described herein. Gas flowing out of the separator 1000 via the gas outlet port 1050 and the piping 4022 flows into the line heater 5200. The line heater 5200 may include, for example, one or more coils disposed in a heated glycol bath. Gas from the separator 1000 flows through the coils until the gas reaches a desired temperature and/or pressure. The gas exiting the line heater 5200 then flows through the choke 5300, which drops the pressure of the gas to a desired line pressure, for example 1,400 psi.

Figure 15:
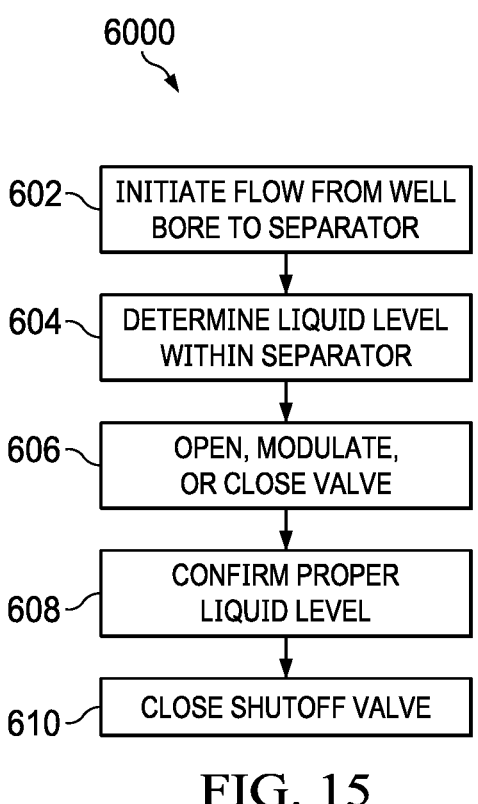
FIG. 15 is a flow diagram of a process for operating the separator of FIG. 2.

Referring now to FIG. 15, a flow diagram of a process 6000 for gas production from a well is shown as substantially described herein. The process 6000 may be a process for producing a pressurized natural gas stream from a fluid being produced from a wellbore. The process 6000 may be fully or partially automated by the controller 4000. At step 602, the gas flow to the separator 1000 from the wellbore W may be initiated. This may be achieved, for example, by opening the shutoff valve 4120 via the controller 4000. Alternatively, the shutoff valve 4120 may be manually opened. The fluid may be directed into the separator 1000 at a pressure substantially equal to the pressure of the fluid being produced from the wellbore.

At step 604, the liquid level L within the interior chamber 1010 may be determined. In particular, the liquid level sensor 1400 may transmit a signal indicating the liquid level L to the controller 4000. The liquid level sensor 1400 may provide real-time feedback of the liquid level L to the controller 4000.

The process 6000 may further include controlling the liquid level L in the separator 1000 between two predetermined set points (e.g., $L_{max}$ and $L_{min}$) by regulating the flow of the liquid, sand, and other solid debris out of a lower portion of the separator 1000. For example, at step 606, the electronically controlled valve 2000 may be opened or closed, or modulated, in response to the determination of the liquid level L. In particular, the controller 4000 may transmit a signal to open the valve 2000 if the liquid level L is at or above the maximum safe liquid level $L_{max}$, and the controller 4000 may transmit a signal to close the valve 2000 if the liquid level L is at or below the minimum safe liquid level $L_{min}$. Modulation of the valve 2000 also allows accumulated sand and debris to exit the separator 1000, such that manual cleaning is not required. The process 6000 may further include directing the gas (substantially cleaned of liquid, sand, and debris) out of the separator 1000 at a pressure substantially equal to the pressure of the wellbore.

At step 608, the liquid level L within the internal chamber 1010 of the separator 1000 may be verified or confirmed to be within a proper range utilizing the upper limit sensor 1064 and/or the lower limit sensor 1066 in case of a malfunction of the liquid level sensor 1400. In particular, the upper limit sensor 1064 and/or the lower limit sensor 1066 may transmit a signal to the controller 4000 indicative of the presence of liquid at the upper sensor port 1060 and the lower sensor port 1062.

At step 610, the shutoff valve 4120 may be closed in response to determining that the liquid level L in the interior chamber 1010 is outside of the proper range. In particular, the controller 4000 may transmit a signal to close the shutoff valve 4120 if the liquid level L is above the upper limit sensor 1064 or if the liquid level L is below the lower limit sensor 1066.Steps 604, 606, 608, and 610 may be repeated periodically, continuously, and/or at predetermined time intervals during the service life of the well.

In some embodiments, the controller 4000 may require a "handshake" verification between the liquid level sensor 1400 and the upper and lower limit sensors 1064, 1066 to actuate the valve 2000. That is, the controller 4000 may require that the liquid level determined by the liquid lever sensor 1400 matches the liquid level determined by the upper and/or lower limit sensors 1064, 1066 prior to actuating the valve 2000. The controller 4000 may use this "handshake" to diagnose a fault in the liquid level sensor 1400, the upper limit sensor 1064, and/or the lower limit sensor 1066. The controller 4000 may use this manner of fault detection to ensure that the separator 1000 is operating properly and may provide feedback to an operator that the separator 1000 is (or is not) operating properly. With this precision control, electronic, real-time feedback provided to the operator to ensure that the separator 1000 is operating properly, and redundant protections to ensure that the separator 1000 does not overflow or empty, it is virtually impossible for gas to be lost to tanks on location.

The system and process of the present disclosure can allow for higher gas and liquid flow rates than the existing sand separator and GPU legacy configuration. Because fluid separation is occurring downstream of the pressure cut in the GPU within the legacy configuration, and the associated gas expansion and system velocities increase, turbulence in the GPU is amplified. As such, the legacy system can be limited to a maximum of 60 barrels/hour. The separator 1000 of the present disclosure allows for liquid separation to occur at significantly higher pressures than in the existing system, which means that the liquid separation of the present disclosure occurs at lower fluid velocity and, consequently, less turbulent flow. For example, the separator 1000 may allow for liquid handling capacities in excess of 200 barrels/hour using a separator 1000 with a working volume of only 8 barrels. This advantage may eliminate the need to employ third party flowback services, which require process flowrates on the order of 120 barrels/hour. Additionally, manpower is greatly reduced utilizing the technology described as almost all aspects of the operation are automated. The operation can be considered "eFlowback".

Figure 17:
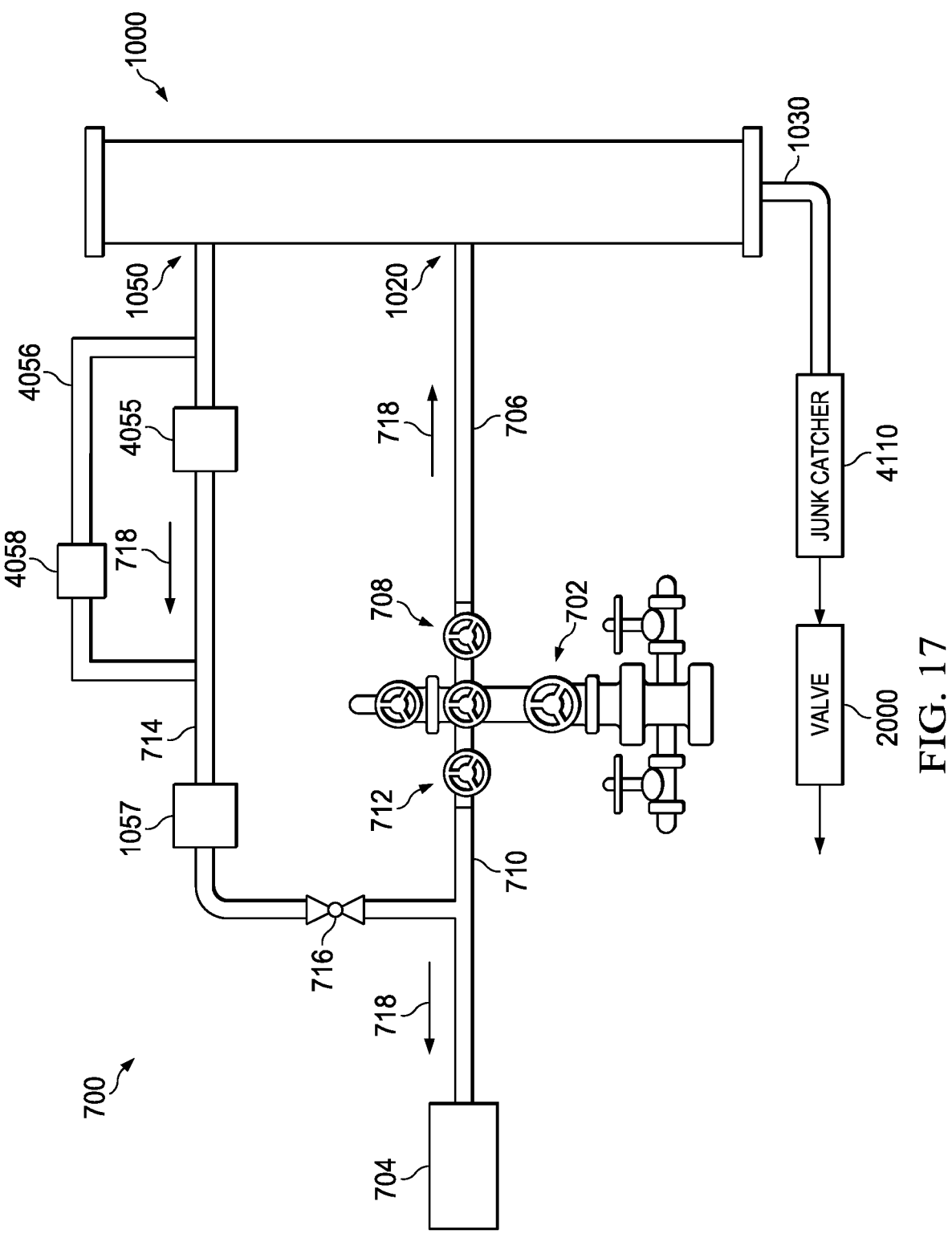
FIG. 17 is a schematic diagram illustrating a separator performing flowback operations according to an embodiment of the present disclosure.
Figure 17A:
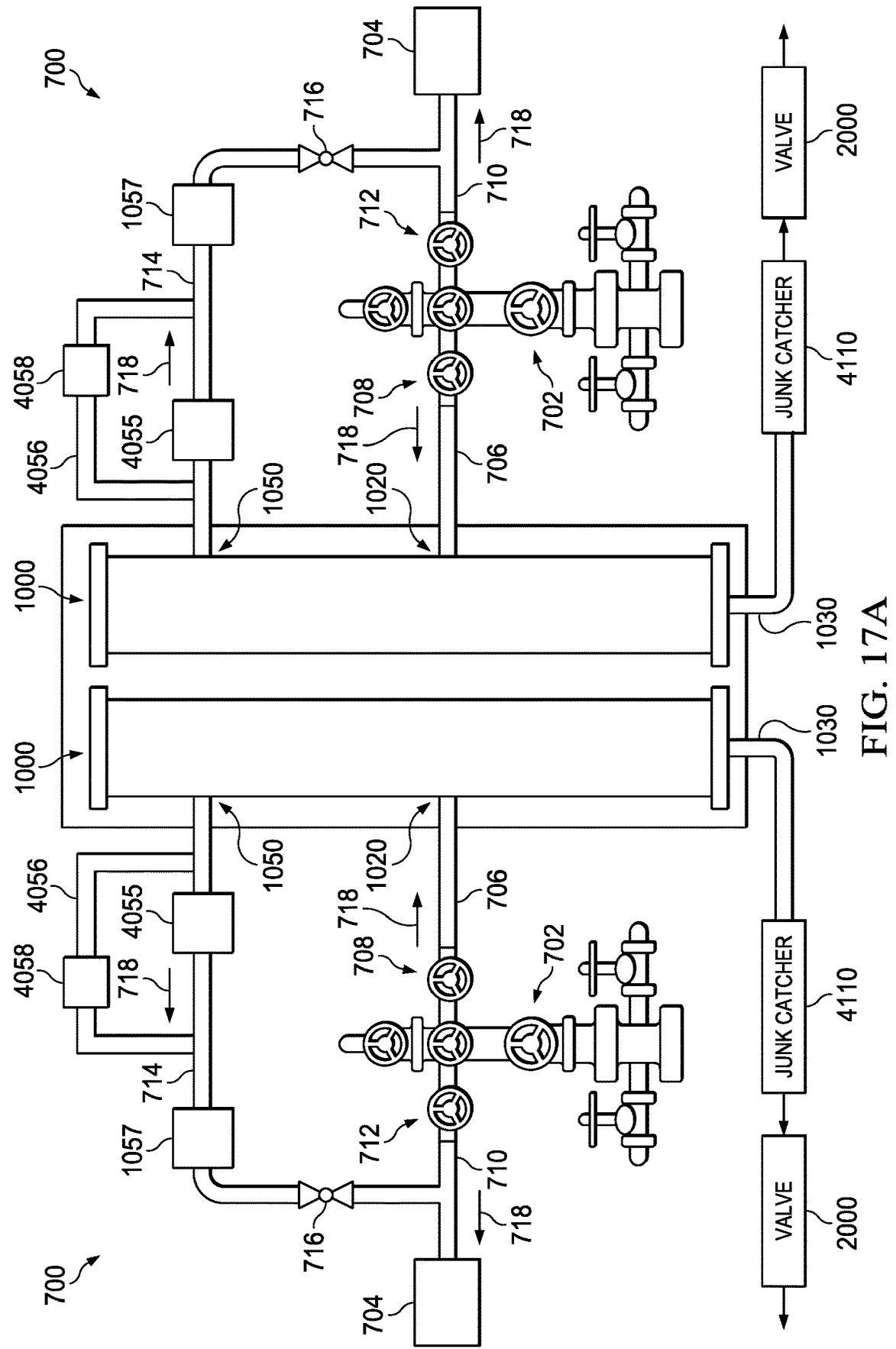
FIG. 17A is a schematic diagram illustrating an embodiment employing dual separators for performing flowback operations according to an embodiment of the present disclosure.
Figure 21:
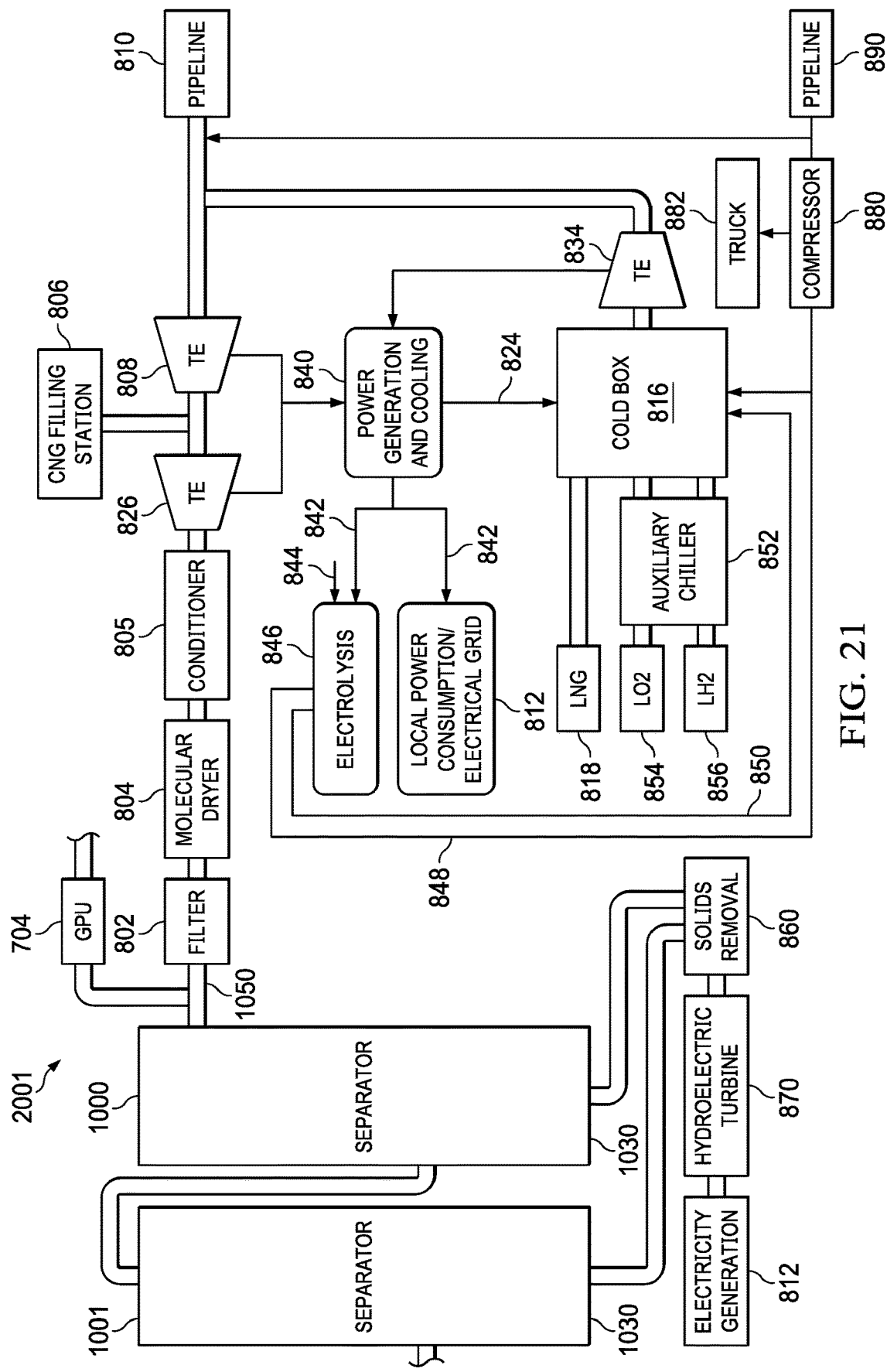
FIG. 21 is a schematic block diagram of a system according to yet another embodiment of the present disclosure using two separators connected in series to provide a pressurized gas stream to various downstream components.

Due to the safety concerns associated with gas production, any of the components of the separator 1000 described herein may be provided in duplicate and/or may include redundant systems in order to ensure safe operation of the separator 1000. Additionally, two separators 1000, 1001 may be built onto one skid and used in series, the first acting as a primary separator and the second as a polishing or back up vessel in the event fluid is carried over from the primary vessel. This arrangement is illustrated in FIG. 21. This configuration is particularly advantageous in systems that use a molecular dryer, as it is critical that free liquid should never make contact with the molecular dryer and molecular sieve, desiccant or other material it contains. Alternatively, in operations where some free liquid carryover is not problematic the separator 1000 can be used in parallel, for example as shown in FIG. 17 where the separator 1000 is working in tandem with conventional production equipment shown in FIG. 1. In this example, the skid may have two separators 1000 in parallel that can be used to flowback two wells, as shown in FIG. 17A. Ultimately, in this configuration, the system can serve in two unique applications.

Figure 1:
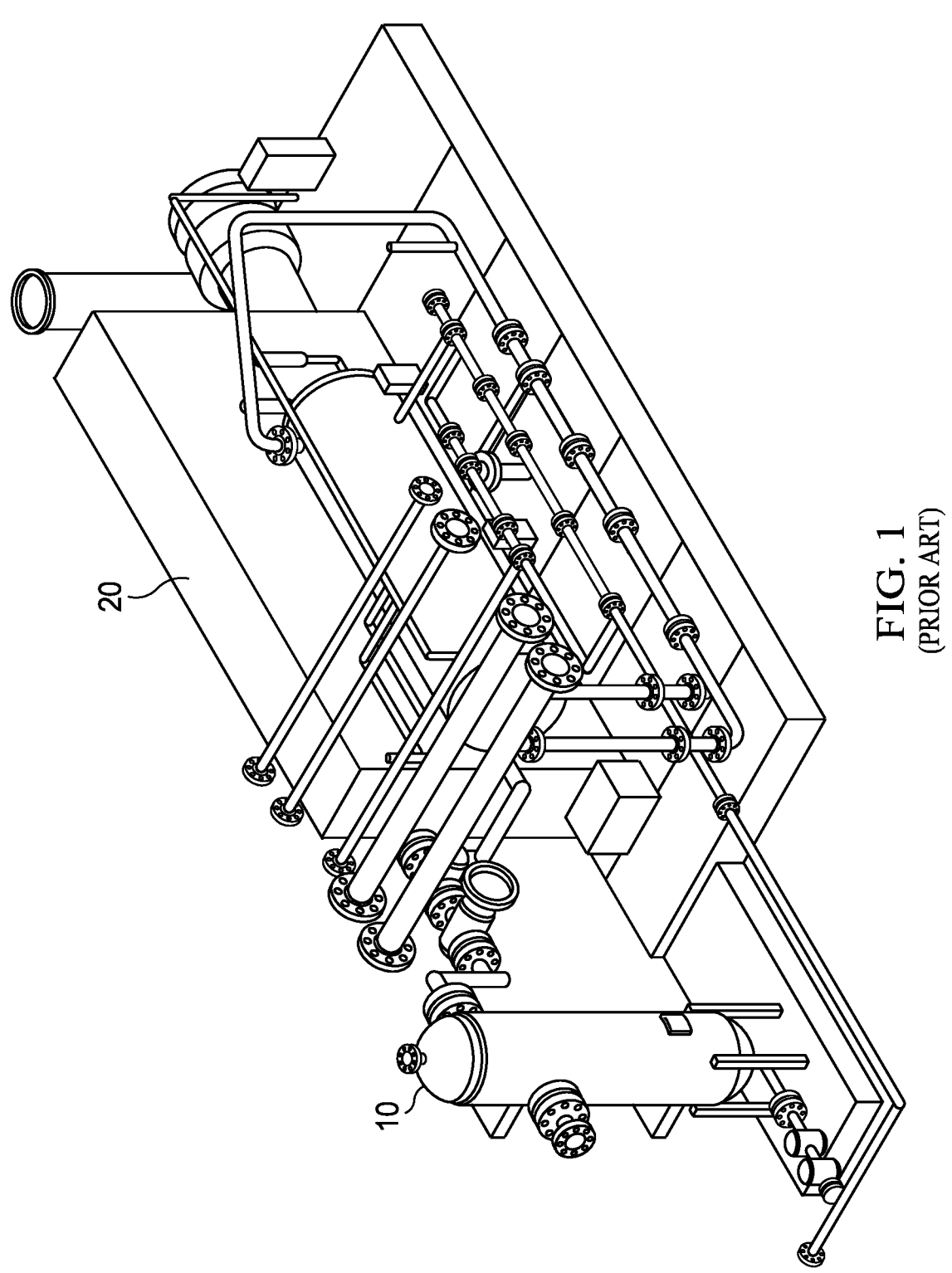
FIG. 1 is a perspective view of a prior art gas production facility, including a conventional sand separator and GPU.
Figure 2:
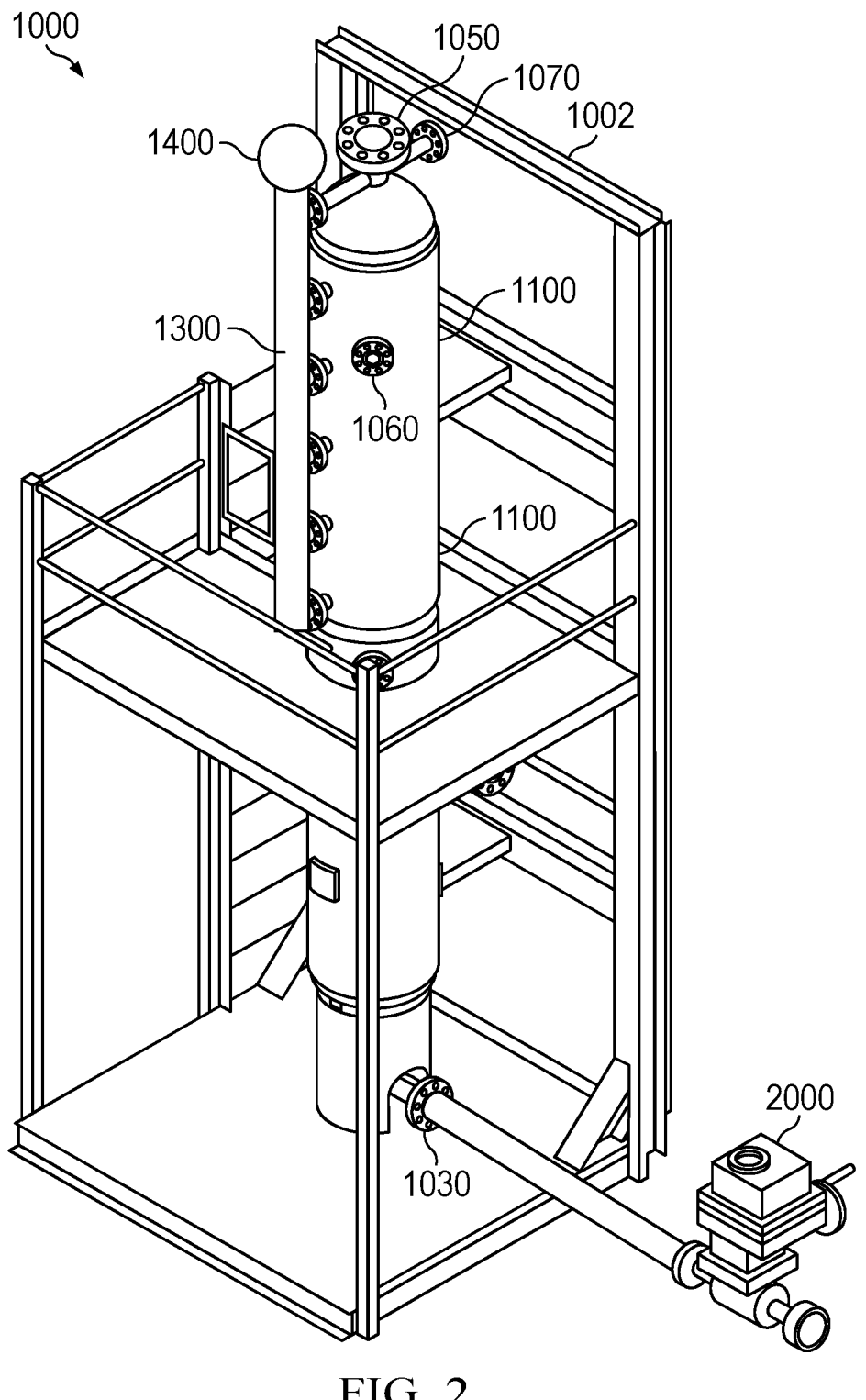
FIG. 2 is a perspective view of a separator according to an embodiment of the present disclosure.
Figure 3:
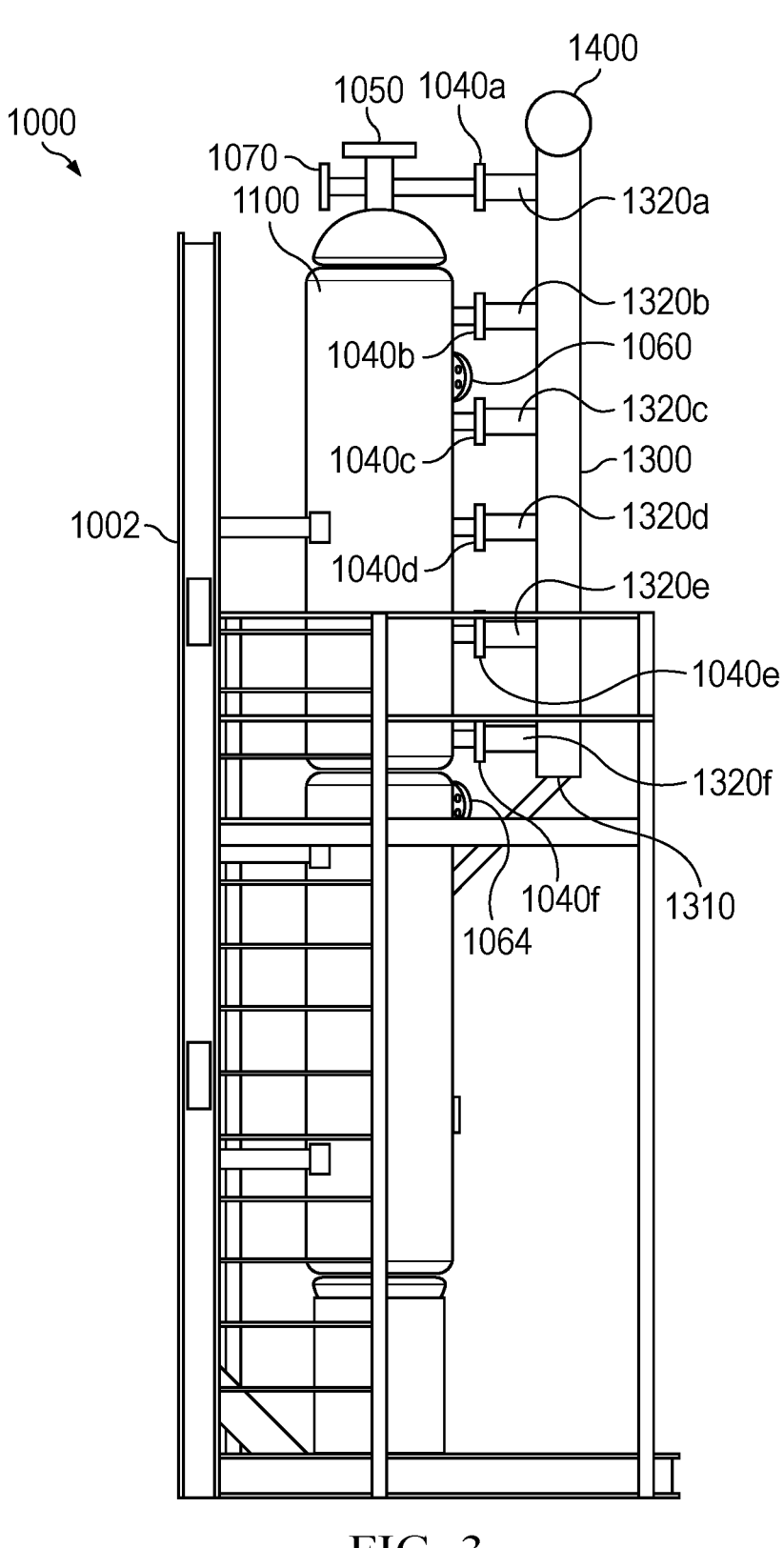
FIG. 3 is a front view of the separator of FIG. 2.
Figure 4:
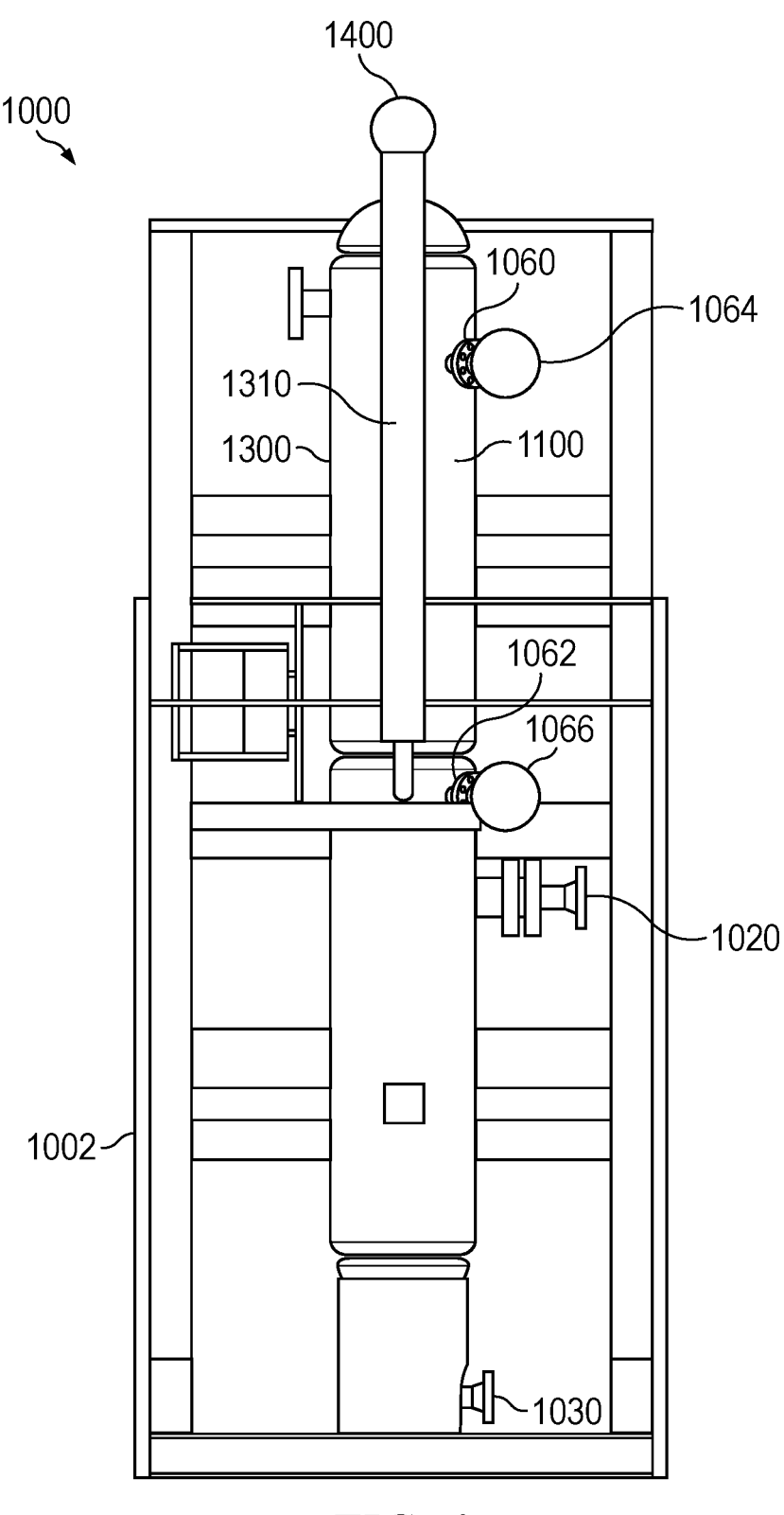
FIG. 4 is a side view of the separator of FIG. 2.
Figure 5:
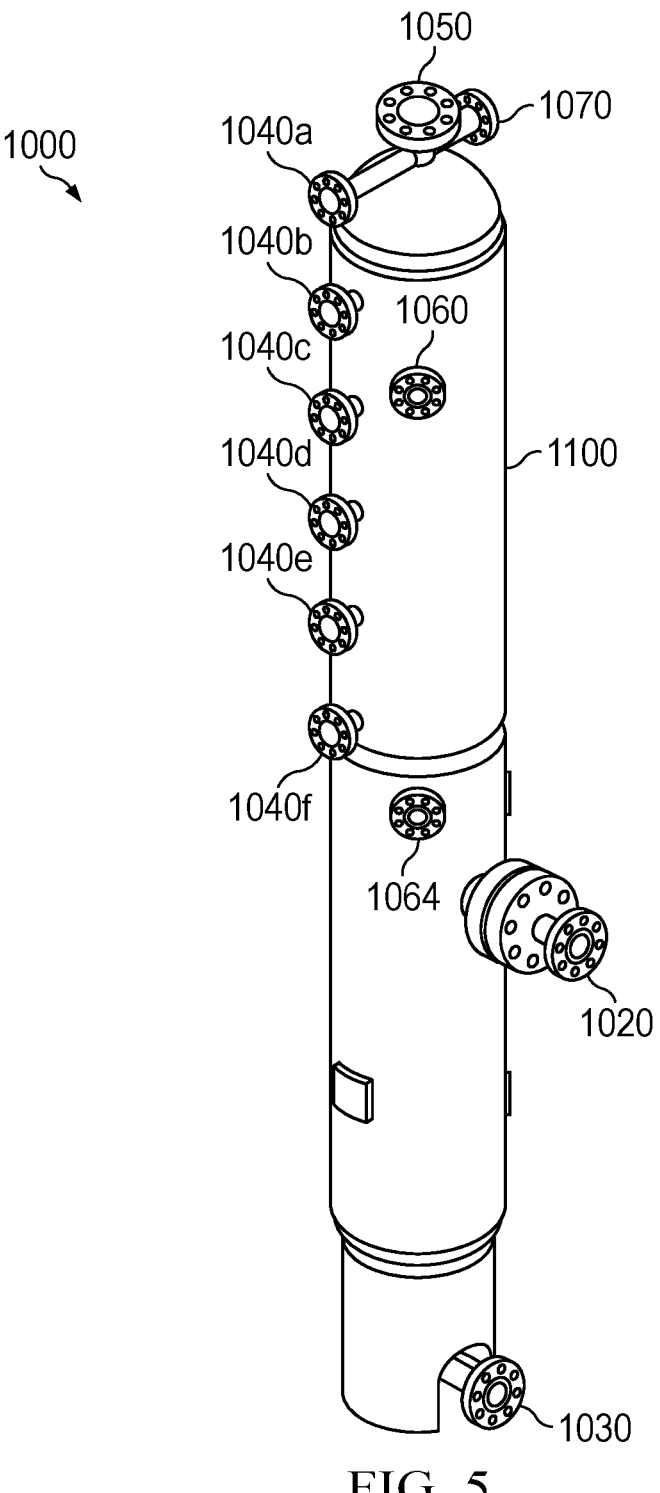
FIG. 5 is a perspective view of the main body of the separator of FIG. 2.

Having generally described the separator 1000 and its operation, various applications in which the separator 1000 may be used will now be described with reference to FIGS. 17-21. However, as those of ordinary skill in the art will appreciate, the separator 1000 may also be used in conjunction with a conventional GPU 20 (as shown in FIG. 1). FIG. 17 illustrates a gas production facility 700 including the separator 1000 being used to perform a flowback operation for a well. The well is designated in FIG. 17 by a tree 702, which is located at the wellhead. The tree 702 may be a standard Christmas tree 702 located above a well and comprising multiple valves and bores through which fluid may be directed from the well. The tree 702 is configured to output fluid produced from a wellbore. The fluid produced from the wellbore may include gas, liquid, sand, and debris.

During flowback operations, liquid, sand, and debris may make up a significant proportion of the fluid being produced from the wellbore. Flowback operations may last for 5 days, 1 week, 2 weeks, or up to a month or more. Permanent production equipment that is used to process gas output from the well is not designed to handle the large amounts of liquid, sand, and debris that is removed from the well during flowback operations. The separator 1000 described at length above may be used to clean the liquid, sand, and debris from the well fluid during flowback operations so that the same gas processing equipment (e.g., gas processing unit 704) may be used to process the gas during flowback operations and during the longer production phase after flowback operations. The gas processing unit 704 may include at least a choke for reducing a pressure of the gas or fluid flowing therethrough. The illustrated arrangement of the separator 1000 and gas processing unit 704 used to provide flowback operations has a much smaller footprint than conventional third-party flowback spreads.

The separator 1000 may be connected to the tree 702 and gas production unit 704 via a series of flow paths, each flow path taking the form of rigid or flexible piping. The gas production facility 700 may include, for example, a first flow path 706 connecting a first outlet 708 of the tree 702 to the inlet 1020 of the separator 1000. The inlet 1020 delivers the fluid into the separator 1000 at a first pressure. The fluid may comprise liquid, gas, sand, and debris. As illustrated and described in detail above, the separator 1000 includes the inlet 1020 and a gas outlet 1050 through which gas (separated from the liquid, sand, and debris) is delivered from the separator 1000. The gas production facility 700 may also include a second flow path 710 connecting a second outlet 712 of the tree 702 to the gas production unit 704. Fluid may flow from the well directly to the gas production unit 704 via the second flow path 710 when a valve at the second outlet 712 is open. The gas production facility 700 may further include a third flow path 714 connecting the gas outlet 1050 of the separator to the gas production unit 704 or, more particularly, to the second flow path 710 leading to the gas production unit 704. As illustrated, a valve 716 may be disposed along the third flow path 714 for selectively opening and closing the third flow path 714. As illustrated in FIGS. 17 and 17A, a by-pass valving system (e.g., including an electronically controlled valve 4055, bypass line 4056, bypass valve 4058, and/or gas measurement device 1057 as discussed with reference to FIG. 8) may be disposed along the third flow path 714 in addition to the valve 716. The by-pass valving system may enable the control of gas flowing from the separator 1000 throughout flowback operations (e.g., when it may be desirable to "burp" the vessel of the separator 1000) and after flowback operations when a substantially flow of gas has been established. In some embodiments, the valve 716 may not be present such that the by-pass valving system provides all control of flow through the third flow path 714.

During flowback operations, a valve at the second outlet 712 of the tree 702 may be closed while a valve at the first outlet 708 of the tree 702 may be opened. That way, fluid containing large amounts of liquid, sand, and debris is directed to the separator 1000 through the first flow path 706. The separator 1000 may remove the liquid, sand, and debris through the outlet 1030 by controlling the valve 2000 according to the method described above. The gas separated from the liquid, sand, and debris is delivered out of the separator 1000 through the outlet 1050 and through the third flow path 714 and the second flow path 710 to the gas production unit 704 (e.g., following arrows 718). The liquid, sand, and debris separated from the gas may pass through a junk catcher or other type of filter 4110 so as not to clog the valve 2000. Downstream of the valve 2000, the liquid, sand, and debris may be manifolded to an outlet of the gas production unit 704 through which liquid, sand, and/or debris may also be directed out of the gas production unit 704.

After flowback operations are completed or once a gas volume suitable for permanent equipment is reached (e.g., once the well is producing largely gas), the valve at the second outlet 712 of the tree 702 may be opened and the valve at the first outlet 708 closed, thereby allowing the fluid to flow from the well directly to the gas production unit 704 instead of the separator 1000. Thus, the separator 1000 may alone or in combination with a conventional system as shown in FIG. 1 replace a conventional flowback spread for removing large amounts of liquid, sand, and debris.

Figure 18:
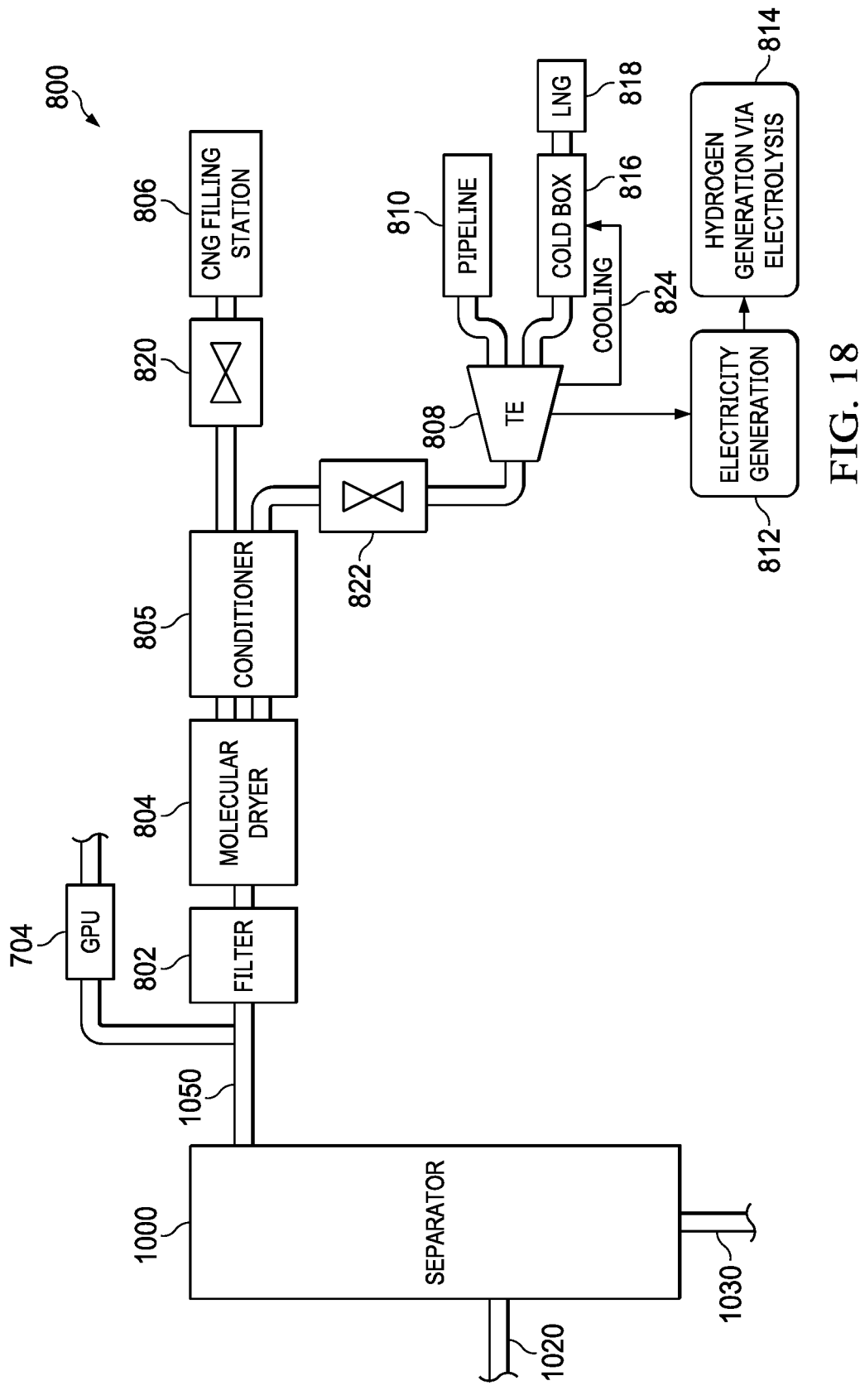
FIG. 18 is a schematic block diagram of a system according to an embodiment of the present disclosure using a separator to provide a pressurized gas stream to various downstream components.

Referring to FIGS. 18-21, the separator 1000 according to the present disclosure may be used not only for gas production to a pipeline, but to generate other products or energy using substantially less equipment on location and at lower cost than conventional methods. This is because the disclosed separator 1000 is able to output a highly pressurized and substantially clean gas stream. Removing all free liquid from the gas stream at approximately wellhead pressure (prior to any pressure cut) enables new and improved uses of wellhead energy. For example, the wellhead energy may be used for one or more of power generation, as subsequently hydrogen, oxygen, a naturally formed compressed natural gas (CNG) production, and liquefied natural gas (LNG) production, and other useful products FIG. 18 illustrates a system 800 that may utilize the pressurized gas stream to simultaneously power one or more processes in addition to, or in lieu of, supplying gas to a pipeline 810. Each of the components illustrated in FIG. 18 may be an individual piece of mobile equipment brought to a well location. The separator 1000, as illustrated, may generally include the inlet 1020, the liquid, sand, and debris outlet 1030, and the gas outlet 1050. The separator 1000 may include the same components and operate as described above with reference to any of FIGS. 2-12 and 16. The inlet 1020 may deliver fluid being produced from a wellbore into the separator 1000 at a first pressure, and the fluid may comprise liquid, gas, sand, and debris. The gas outlet 1050 is configured for delivering gas separated from the liquid, sand, and debris out of the separator 1000 at a second pressure. The second pressure may be substantially equivalent to the first pressure in some embodiments. In other embodiments, the second pressure may be different than the first pressure. The outlet 1050 may be connected to a particulate filter 802, which may be connected to a molecular dryer 804. As such, the outlet 1050 is connected to the molecular dryer 804. The outlet 1050 may also or alternatively connected to a gas processing unit 704.

The molecular dryer 804 is a molecular vapor dryer, which removes water vapor from the gas stream. As those of ordinary skill in the art will appreciate, the molecular dryer 804 may be a molecular sieve, a membrane, or any other device or process capable of removing all or most of the water vapor from the gas stream output from the outlet 1050, such that the remaining gas stream could meet the parts per million (PPM) requirements needed for powering certain downstream equipment. As illustrated, the molecular dryer 804 has at least one outlet through which the gas substantially removed of water vapor is directed out of the molecular dryer 804. As those of ordinary skill in the art will appreciate, the molecular dryer could be any device that removes water vapor from gas.

After passing through the molecular dryer 804, the gas stream may be split and/or directed downstream to perform one or more processes. In the illustrated embodiment, the gas stream is split after the molecular dryer 804. The different portions of the gas stream are then delivered to a CNG filling station 806, delivered to a pipeline 810, liquefied to produce LNG 818, used to generated electricity 812, and the power would then be used to generate hydrogen 814. As those of ordinary skill in the art will appreciate, CNG filling station 806 may be stationary storage tanks or trucks. The stream of gas directed into the CNG filling station is compressed natural gas, which the industry defines as CNG. Because the CNG produced through this process does not use external or human-made compression, it will be referred to herein as "naturally compressed natural gas." Although all these processes are illustrated in FIG. 18, it should be understood that fewer or more processes may be performed using the pressurized gas stream output from the molecular dryer 804. The one or more gas streams may be output from the molecular dryer 804 at a third pressure, which may be substantially the same or different than one or both of the first and second pressures described above.

As illustrated, the CNG filling station 806 may be connected to an outlet of the molecular dryer 804 such that a first gas stream output from the molecular dryer may be directed to the CNG filling station 806. In some embodiments, a pressure control valve 820 is disposed between the CNG filling station and the molecular dryer for reducing or otherwise controlling the pressure of the gas being directed out of the molecular dryer from the third pressure to a lower pressure. For example, the third pressure may be approximately 5,000 psi, while the fourth pressure may be approximately 3,600 psi. That way, the gas stream is brought down to a desired pressure needed for filling CNG tanks. In other embodiments, the pressure control valve 820 may not be present.

Modern CNG is typically compressed from pipeline pressure as low as 50 psi up to pressures of approximately 5,000 psi. By precisely removing all free liquid from the well at wellbore pressures via the separator 1000 and molecular dryer 804, CNG may be generated with no compression. There is significant reduction of capital, operating costs and emissions associated with eliminating the compression element of producing CNG and allowing the wellbore pressure to provide the pressure necessary to fill tanks or high-pressure pipelines.

As illustrated in FIG. 18, the system 800 may comprise a turbo expander 808 connected to an outlet of the molecular dryer 804. An exemplary turbo expander converts changes in pressure into rotational/mechanical energy that can be used for compression, power generation and the like. (As used herein, a "turbo expander" is defined as a device that creates mechanical energy from a pressure differential). It may also produce cooling via the Jules Thompson Effect. It may include and be coupled with or connected to a gas compressor, an electric generator or any other device, system or process requiring the mechanical energy and/or rotational energy it produces. As those of ordinary skill in the art will appreciate, wherever it is disclosed to use a turbo expander, a piston expander, reciprocating expander, centrifugal compressor or a positive displacement expander may be used in its place. An exemplary combination turbo expander compressor might include a Compander™ brand turbo expander/compressor. The turbo expander 808 may be powered by the gas directed out of the molecular dryer and used to generate electricity (812) and subsequently hydrogen (814) through electrolysis. The turbo expander 808 may include an inlet for receiving the pressurized clean gas flow from the molecular dryer 804 and one or more outlets through which gas is output from the turbo expander at a lower pressure. In some embodiments, the system 800 may include a pressure control valve 822 disposed between the outlet of the molecular dryer 804 and the turbo expander 808 for reducing a pressure of the gas being directed out of the molecular dryer from one pressure to a lower pressure. For example, the pressure control valve 822 may reduce the pressure from approximately 5,000 psi to approximately 2,500 psi or the technical limits of existing turbo expander technology. Existing Utica wells can generate the equivalent of over 10,000 horsepower of energy. This may bring the gas stream down to a desired pressure so that the gas stream is output from the turbo expander at an appropriate pipeline pressure (e.g., 1,000 psi). It should be noted that the pressures listed here are merely examples and other embodiments may include the gas stream at different pressures.

The turbo expander 808 may function as a generator, converting the pressure drop of the gas moving through the turbo expander 808 into electricity (812). The pressurized gas flow is able to be used in a turbo expander due to the fact that all liquid has been removed from the gas stream (e.g., via the separator 1000 and the molecular dryer 804) without a significant pressure drop. In some embodiments, the generated electricity (812) may be used to power on-site equipment or distributed to the local power grid. In some embodiments, the electricity may be used to generate emissions free hydrogen through electrolysis (814). Using the separator 1000, the molecular dryer 804, and the turbo expander 808, the system 800 may be able to generate electricity at the well with zero emissions.

As illustrated, the system 800 may include a gas pipeline 810 connected to the outlet of the turbo expander 808. In other embodiments, the system 800 may include a gas pipeline 810 connected to an outlet of the molecular dryer 804. The gas pipeline 810 may deliver natural gas to a natural gas pipeline. As will be understood by one of skill in the art, the gas pipeline 810 may deliver natural gas at a pipeline pressure (e.g., 1,000 psi) that is lower than the pressure at which gas is output from the molecular dryer 804 (e.g., 5,000 psi). As such, the pressure of the gas is reduced prior to supplying the gas to the pipeline 810. This pipeline pressure may be a pressure at which the natural gas grid supplies gas to communities. In FIG. 18, for example, the turbo expander 808 is connected between the gas pipeline 810 and the molecular dryer 804 for reducing the pressure of the gas being directed through the turbo expander 808 to a lower pressure that is substantially equal to the desired pipeline pressure and generating electricity and subsequently hydrogen in the process. The pressure control valve 822 may also reduce the pressure exiting the molecular dryer. In some embodiments, although not explicitly depicted, the turbo expander may be omitted, replaced with a JT (Joule Thomson) valve or the pipeline 810 may not be connected to the turbo expander 808. In such instances, a pressure control valve 822 may be connected between the gas pipeline 810 and the molecular dryer 804, and the pressure control valve 822 may reduce the pressure of gas being directed out of the molecular dryer 804 to a pressure that is substantially equal to the desired pipeline pressure.

The disclosed system 800 may provide gas to the pipeline 810 with reduced or no emissions. Because of the use of the disclosed separator 1000 in combination with the molecular dryer 804, the gas being provided to the pipeline 810 and/or other downstream components of the system 800 is substantially free of water vapor and contaminants. When the pressure of the gas is reduced, by a pressure control valve 822, JT valve, turbo expander 808, or all three, there is no possibility of water vapor in the gas stream freezing and damaging equipment. Therefore, no burners or other heat sources are needed to prevent water from freezing in the gas stream. As such, the pressure reduction needed to bring the gas stream to pipeline pressure can be accomplished without the emissions released by conventional burners.

The separator 1000, molecular dryer 804, and turbo expander 808 may also enable the generation of LNG 818 without electricity or outside energy. LNG 818 is natural gas that has been cryogenically cooled to −260° F. to liquify LNG 818 and is typically stored at 5 PSIG or less. As illustrated, the system 800 may include a cold box 816 connected to the turbo expander 808. In other embodiments, although not explicitly depicted, the system 800 may include a cold box 816 connected to an outlet of the molecular dryer 804. (The cold box 816 is configured to capture the cold gas exiting the turbo expander 808 (or molecular dryer 804) so as to produce LNG 818 at lower pressure than the incoming gas. As used herein "cold box" is defined as one or more components of a heat exchange equipment, valves, controllers, heat retention and all other associated devices and processes to support the liquification process) In the embodiment of FIG. 18, the turbo expander 808 may produce supercooled gas in additional to electricity 812 and subsequently hydrogen 814. The turbo expander 808 may be connected to refrigeration compression. The cold box 816 may be connected to refrigerated fluid or gas outlet to receive the cooling fluid 824 for cryogenically cooling the gas exiting the turbo expander 808 (or molecular dryer 804).

The disclosed system 800, in which pressurized gas is provided via the separator 1000 and molecular dryer 804, may aid in lowering the capital and operating expense of a liquefaction facility for generating LNG, since no outside electricity or energy is needed to reduce the gas pressure or operate the cold box 816. The disclosed system 800 may further reduce the environmental and emissions footprint needed for producing LNG. Depending on gas composition, additional gas conditioning downstream of the molecular dryer maybe be required for LNG production, such as carbon dioxide and heavy hydrocarbon (e.g., Butane, Pentane, etc.) removal. Accordingly, the embodiments shown in FIGS. 18-21 optionally include a conditioner 805 immediately downstream of the molecular dryer 804.

Figure 19:
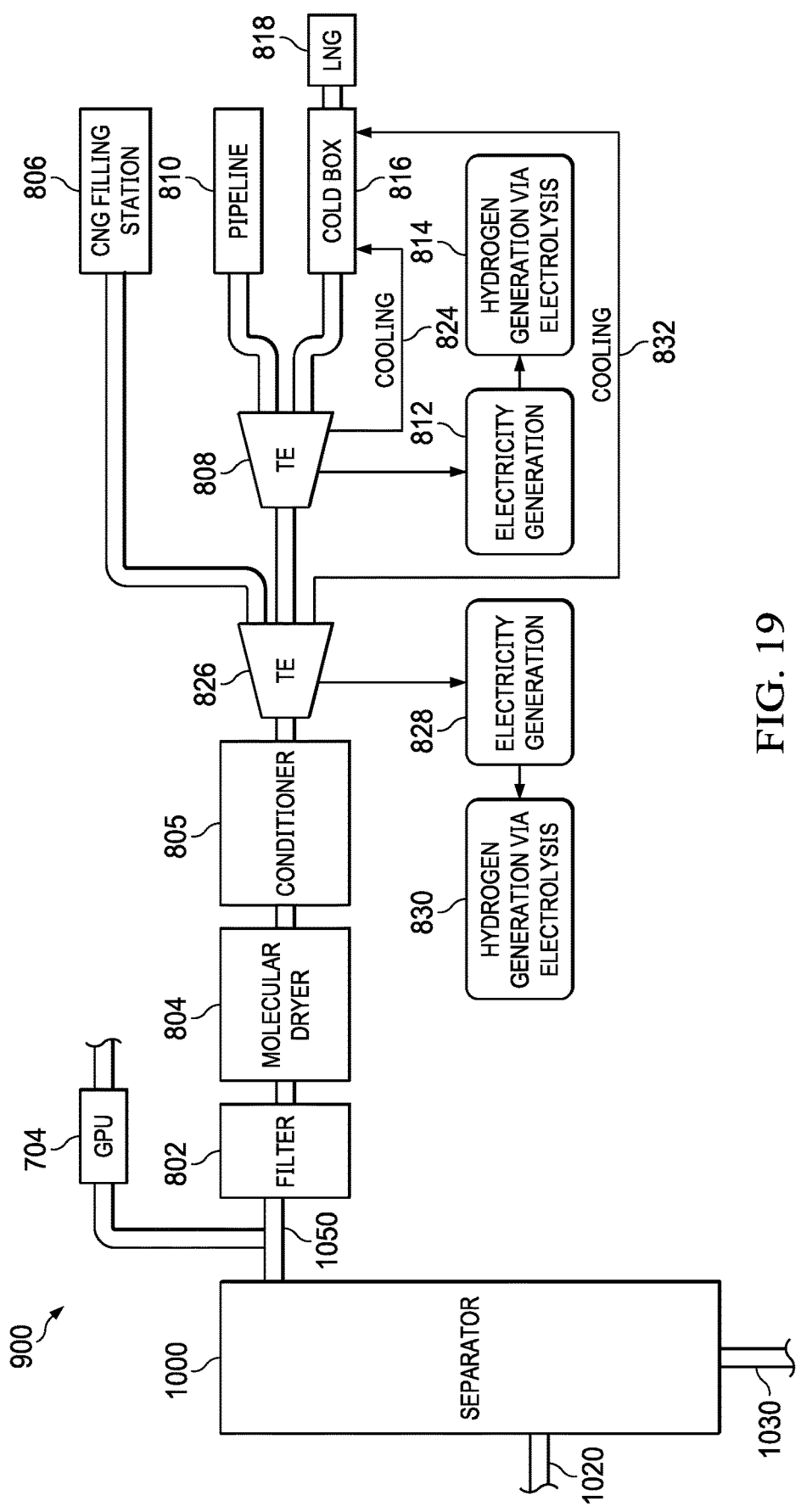
FIG. 19 is a schematic block diagram of a system according to another embodiment of the present disclosure using a separator to provide a pressurized gas stream to various downstream components.

FIG. 19 depicts another system 900 that may utilize the pressurized gas stream to simultaneously power one or more processes in addition to, or in lieu of, supplying gas to a pipeline 810. The system 900 shown in FIG. 19 is similar to the system 800 shown in FIG. 18, except that the pressure control valves 820 and 822 have been replaced with another turbo expander 826. This second turbo expander 826 is disposed between the outlet of the molecular dryer 804 and the turbo expander 808. The turbo expander 826 may reduce the pressure of the gas being directed out of the molecular dryer 804, and the turbo expander 808 may then reduce the pressure of the gas being directed out of the turbo expander 826. In general, any pressure drop that is needed to provide gas to a downstream process may be accomplished using a turbo expander 808, 826 as illustrated. This may help to further conserve energy by converting all pressure drops into work to generate electricity 812, 828, hydrogen via hydrolysis 814, 830, and/or cooling fluid 824, 832 to supply a cold box 816. Any desired number of turbo expanders may be connected in series between the molecular dryer 804 and the downstream component(s) needing a reduced pressure flow of gas.

As shown in FIG. 19, the system 900 may include a compressed natural gas filling station 806 connected to an outlet of the closest turbo expander 826 to the molecular dryer 804. The turbo expander 826 connected between the compressed natural gas filling station 806 and the molecular dryer 804 may reduce the pressure of gas being directed out of the molecular dryer to a lower pressure that can be used to fill CNG tanks (806). The CNG filling station 806 may need gas provided at a pressure higher than some other downstream processes (e.g., LNG generation or supplying the pipeline), which is why it receives gas output after the first pressure drop via turbo expander 826.

Figure 20:
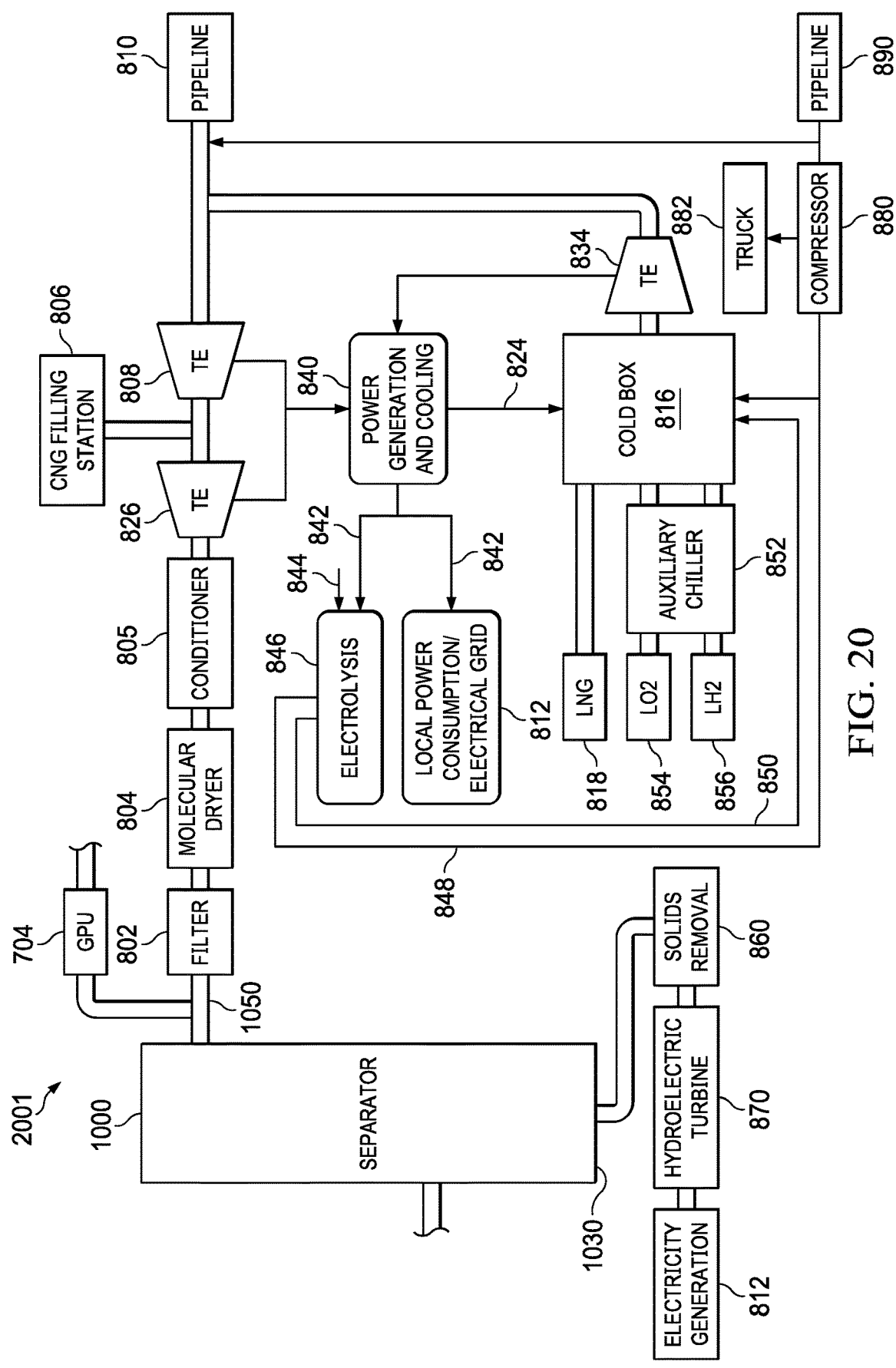
FIG. 20 is a schematic block diagram of a system according to yet another embodiment of the present disclosure using a separator to provide a pressurized gas stream to various downstream components.

FIG. 20 depicts yet another system 2001 that may utilize the pressurized gas stream to simultaneously power one or more processes in addition to, or in lieu of, supplying gas to a pipeline 810. The system 2001 shown in FIG. 20 is similar to the system 800 shown in FIG. 19, except that an auxiliary chiller 852 is connected to the cold box 816 to further chill hydrogen 848 and/or oxygen 850 being produced through the electrolysis process 846 to produce liquid hydrogen (H$_2$) and liquid oxygen (O$_2$). As those of ordinary skill in the art will appreciate, because oxygen liquifies at a higher temperature than hydrogen, each would need its own unique flow path from the auxiliary chiller 852 or alternatively separate heat exchange/auxiliary chilling devices. Power 842 output from the turbo expanders 808 and 826 through the power generation and cooling steps 840 is used to separate hydrogen 848 from oxygen 850 in an electrolysis process 846. The hydrogen 848 and oxygen 850 are then fed into the cold box 816 (which is made cold as noted above with reference to FIGS. 18 and 19 through the cooling fluid exiting the turbo expanders 808 and 826 as the gas passes through these devices). The cold box 816 can produce LNG 818 as described in FIGS. 18 and 19 and also liquid oxygen 854 and liquid hydrogen 856 through the aid of auxiliary chiller 852, which could be powered by a turbo expander via electricity or mechanically through compression. The auxiliary chiller 852 further cools these gases to the point that they undergo a phase change and become liquid. The liquid oxygen 854 is cooled to approximately −297° F. and the liquid hydrogen 856 is cooled to approximately −423° F. The oxygen 850 is stored at approximately 350 psi or lower as it passes through the auxiliary chiller 852 and the hydrogen 848 is stored at approximately 45 psi as it passes through the auxiliary chiller 852.

FIG. 20 illustrates that another turbo expander 834 can be connected downstream of turbo expander 808 to generate additional power and cooling by harvesting the energy generated by further reducing the gas pressure to get it to a pressure which would allow it to be transported by gas pipeline 810. In the embodiments shown in, and described in reference to, FIGS. 18-21, a compressor may optionally be connected to, and powered by, the turbo expanders within the system, either through direct connection compression or power by the electricity generated within the process. These compressors can be utilized for facilitating the compression of hydrogen, oxygen, natural gas, refrigerant gases or other gases into a truck, a separate pipeline, the cold box or for blending with natural gas in pipeline 810.

The embodiment in FIG. 20 further proposes to harvest additional energy from the high-pressure liquid exiting from the bottom of the separator 1000. First, the liquid, sand and debris existing the separator 1000 through outlet port 1030 must have the solids material removed from it. This is done by passing the fluid mixture through a mechanism for removing solids 860. As those of ordinary skill in the art will recognize the mechanism for removing solids from the liquid may include a strainer or junk catcher or similar device. Once the sand and other solid debris is removed the resultant high-pressure liquid can be passed through hydroelectric turbine 870, which in turn can generate electricity 812 for local power consumption (e.g., in powering the various equipment used in the above mentioned processes) and/or for delivery to the power grid. As will be appreciated by those of ordinary skill in the art multiple hydroelectric turbines 870 may be connected in series to harvest as much energy as possible from the high-pressure liquid.

The embodiment of FIG. 20 may further comprise a compressor 880 fluidly connected to the electrolysis device 846 into which the hydrogen 848 may be fed to allow the hydrogen to be compressed and subsequently delivered to customers, for example, via a truck 882 or the gas pipeline 810. Alternatively, the hydrogen 848 can be delivered via a dedicated hydrogen pipeline 890. As those of ordinary skill in the art will appreciate compressed hydrogen can be blended with natural gas as burned for power generation as newer gas turbine engines are capable of burning a blend of hydrogen and natural gas. In one exemplary embodiment, the fuel for such a turbine contains 15% hydrogen. Similarly, the truck 882 can transport the hydrogen gas for subsequent blending or other use at a remote location.

FIG. 21 illustrates the system 2001 of FIG. 20 having two separators 1000 and 1001 coupled in series to provide the pressurized gas flow to the molecular dryer 804 and other downstream components, as referenced above.

The systems 800, 900 and 2001 of FIGS. 18-21, are merely examples of different arrangements of processes that may be combined to utilize the pressurized gas output from separator 1000. Other arrangements may be possible in other embodiments. Since free and abundant energy is available through the pressurized flow of gas from the separator 1000, there is no need to design the entire system around one product (e.g., CNG, LNG, electricity, or hydrogen). Since CNG and LNG can be produced without compression, all the waste energy from the pressure drops through the system can be harnessed to generate electricity and/or to make hydrogen.

While various embodiments of a separator, gas processing facility, method, and system were provided in the foregoing description, those skilled in the art may make modifications and alterations to these aspects without departing from the scope and spirit of the invention. For example, it is to be understood that this disclosure contemplates that, to the extent possible, one or more features of any aspect can be combined with one or more features of any other aspect. As another non-limiting specific example, because natural gas is often odorless, as those of ordinary skill in the art will appreciate it is customary to add an odorant, such as ethyl mercaptan, so that a gas leak can be detected anywhere the gas is being processed or consumed. Therefore, such an odorant can be added to any of the gas products produced in accordance with the present invention. Accordingly, the foregoing description is intended to be illustrative rather than restrictive. The invention described hereinabove is defined by the appended claims, and all changes to the invention that fall within the meaning and the range of equivalency of the claims are to be embraced within their scope.

What is claimed is:

1. A separator for separating one or more of liquid, gas, sand, and debris from a fluid produced from an unrestricted wellbore, the separator comprising:

a vessel defining an interior chamber;

an inlet fluidly coupled with the wellbore to direct the fluid produced from the wellbore into the vessel, wherein the fluid is introduced into the vessel at a first pressure;

an outlet to direct the gas out of the vessel at a pressure substantially equal to the first pressure;

at least one liquid level sensor to detect a level of the liquid within the interior chamber of the vessel;

an electronically controlled valve in fluid communication with an outlet port of the vessel; and a controller connected to the at least one liquid level sensor and the electronically controlled valve, the controller programmed to open, close, or modulate the electronically controlled valve to regulate a combined flow of the liquid, sand, and debris out of the outlet port of the vessel at least partially in response to the level of the liquid in the interior chamber of the vessel detected by the at least one liquid level sensor;

wherein the separation of the one or more of liquid, gas, sand, and debris occurs at a pressure substantially equal to the first pressure within the interior chamber, the first pressure being an unregulated pressure of the fluid flowing from the wellbore and of at least 1,500 psig.

2. The separator of claim 1, wherein the controller is programmed to open, close, and/or modulate the electronically controlled valve to maintain a predetermined liquid level in the interior chamber of the vessel.

3. The separator of claim 1, further comprising a bridle in fluid connection with the interior chamber of the vessel, wherein the at least one liquid level sensor is disposed within the bridle.

4. The separator of claim 3, wherein the vessel further comprises one or more ports in fluid connection with the bridle to allow equalization of the level of the liquid between the bridle and the interior chamber of the vessel.

5. The separator of claim 3, wherein a bottom portion of the bridle is oriented at an angle to the interior chamber of the vessel.

6. The separator of claim 3, wherein a top portion of the bridle is fluidly connected to outlet piping at a top of the vessel.

7. The separator of claim 3, further comprising a drain line extending from the bridle to a location downstream of the electronically controlled valve, the drain line being coupled to a valve.

8. The separator of claim 1, wherein the at least one liquid level sensor is disposed within the vessel.

9. The separator of claim 1, wherein the at least one liquid level sensor comprises a guided wave radar sensor.

10. The separator of claim 1, wherein the at least one liquid level sensor comprises a differential pressure sensor.

11. The separator of claim 1, further comprising at least one limit sensor for indicating that the level of the liquid is above or below a predetermined set point within the interior chamber of the vessel.

12. The separator of claim 11, wherein the at least one limit sensor includes an upper limit sensor for indicating that the level of the liquid is above a predetermined high point within the interior chamber of the vessel.

13. The separator of claim 11, wherein the at least one limit sensor includes a lower limit sensor for indicating that the level of the liquid is below a predetermined low point within the interior chamber of the vessel.

14. The separator of claim 1, further comprising:

a first density sensor for indicating a density of the fluid within the interior chamber of the vessel; and a second density sensor located downstream of the electronically controlled valve for indicating a flow rate and/or density of a fluid output from the vessel.

15. The separator of claim 1, further comprising:

a pressure sensor for indicating a pressure of a fluid downstream of the electronically controlled valve.

16. The separator of claim 1, wherein the controller is programmed to operate and provide feedback to an operator in or substantially near real-time.

17. The separator of claim 1, wherein the electronically controlled valve comprises a dump valve.

18. The separator of claim 17, wherein the dump valve is configured to be selectively operated in a hand mode and/or the controller is programmed to allow operation of the dump valve in a fixed position.

19. The separator of claim 17, further comprising an emergency shutdown (ESD) valve connected downstream of the dump valve, wherein the ESD valve is connected to the controller and electronically controlled to close under certain conditions.

20. The separator of claim 1, further comprising a strainer disposed upstream of the electronically controlled valve for removing larger debris particles but permitting sand and small debris particles to pass through the electronically controlled valve.

21. The separator of claim 1, wherein the inlet comprises a tube extending into the interior chamber of the vessel with a terminal end of the tube being partially obstructed by a baffle adapted to direct incoming fluid to a bottom of the interior chamber.

22. The separator of claim 1, further comprising a diffuser disposed in the interior chamber of the vessel, the diffuser adapted to generally direct the gas upward and direct the sand and the debris downward within the vessel.

23. The separator of claim 1, further comprising a shutoff valve in fluid communication with, and upstream of, the inlet and electronically connected to the controller, the controller being programmed to open, close and/or modulate the shutoff valve to control the flow of the fluid produced from the wellbore being directed into the vessel.

24. The separator of claim 1, wherein the outlet is disposed at a top of the vessel.

25. The separator of claim 1, further comprising a valve position sensor for indicating an operational position of the electronically controlled valve, the valve position sensor connected to the controller for providing feedback of the operational position of the electronically controlled valve to the controller.

26. The separator of claim 1, further comprising:

a second electronically controlled valve downstream of the outlet;

a bypass flowline extending from the outlet to a location downstream of the second electronically controlled valve; and a bypass valve in the bypass flowline for selectively controlling flow of the gas through the bypass flowline.

27. A separator for separating one or more of liquid, gas, sand, and debris from a fluid produced from a wellbore, the separator comprising:

a vessel defining an interior chamber;

an inlet fluidly coupled with the wellbore and configured to deliver the fluid produced from the wellbore into the vessel at a first pressure;

an outlet configured to direct the gas out of the vessel at a pressure substantially equal to the first pressure;

at least one liquid level sensor configured to detect a level of the liquid within the interior chamber of the vessel;

an electronically controlled valve in fluid communication with an outlet port of the vessel; and a controller connected to the at least one liquid level sensor and the electronically controlled valve and programmed to open, close, or modulate the electronically controlled valve to regulate a combined flow of the liquid, sand, and debris out of the outlet port of the vessel at least partially in response to a level of the liquid in the interior chamber of the vessel detected by the at least one liquid level sensor;

wherein the separation of the one or more of liquid, gas, sand, and debris occurs at a pressure substantially equal to the first pressure within the interior chamber, the first pressure being an unregulated pressure of the fluid flowing from the wellbore and of at least 1,500 psig.

\* \* \* \* \*